United States Patent
Watanabe et al.

(10) Patent No.: US 11,178,644 B2
(45) Date of Patent: Nov. 16, 2021

(54) BASE STATION, TERMINAL, COMMUNICATION METHOD, AND WIRELESS COMMUNICATION SYSTEM

(71) Applicant: FUJITSU LIMITED, Kawasaki (JP)

(72) Inventors: Hiroaki Watanabe, Kawasaki (JP); Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/845,141

(22) Filed: Apr. 10, 2020

(65) Prior Publication Data

US 2020/0245298 A1 Jul. 30, 2020

Related U.S. Application Data

(63) Continuation of application No. PCT/JP2017/038809, filed on Oct. 26, 2017.

(51) Int. Cl.
*H04W 72/04* (2009.01)
*H04W 16/14* (2009.01)
*H04W 74/08* (2009.01)
*H04W 74/00* (2009.01)

(52) U.S. Cl.
CPC ........... *H04W 72/04* (2013.01); *H04W 16/14* (2013.01); *H04W 74/002* (2013.01); *H04W 74/0833* (2013.01); *H04W 74/0866* (2013.01)

(58) Field of Classification Search
CPC ............. H04W 72/04; H04W 74/0833; H04W 74/002; H04W 74/0866; H04W 16/14; H04L 1/1887; H04L 1/1893
See application file for complete search history.

(56) References Cited

U.S. PATENT DOCUMENTS

2006/0292992 A1* 12/2006 Tajima .............. H04W 74/0833 455/67.11
2018/0084495 A1* 3/2018 Moon ................. H04L 1/18
2018/0139774 A1* 5/2018 Ma .................... H04W 72/1289

FOREIGN PATENT DOCUMENTS

JP 2007-6080 A 1/2007

OTHER PUBLICATIONS

Intel Corporation, Uplink URLLC Transmission without Grant, Jan. 16-20, 2017, 3GPP TSG RAN WG1 NR Ad-Hoc Meeting, Spokane, USA. (Year: 2017).*
ZTE et al., "Basic Grant-free Transmission for URLLC", Agenda Item: 8.1.3.4.3, 3GPP TSG-RAN WG1 Meeting #88, R1-1701594, Athens, Greece, Feb. 13 -17, 2017.
ZTE et al., "WF on grant-free for UL URLLC", Agenda Item: 8.1.3.4.3, 3GPP TSG-RAN WG1 Meeting #88, R1-1703788, Athens, Greece, Feb. 13-17, 2017.

(Continued)

*Primary Examiner* — Said M Elnoubi
(74) *Attorney, Agent, or Firm* — Myers Wolin, LLC

(57) ABSTRACT

A base station capable of performing wireless communication with a wireless communication device with a Grant-free method, the base station includes: a reception circuit configured to receive a first signal transmitted from the wireless communication device by using a shared radio resource allocated to the wireless communication device; and a transmission circuit configured to transmit a second signal including information regarding a radio resource used for retransmission to the wireless communication device when retransmission of the first signal is requested to the wireless communication device.

16 Claims, 18 Drawing Sheets

(56) References Cited

OTHER PUBLICATIONS

International Search Report issued by the Japan Patent Office for corresponding International Patent Application No. PCT/JP2017/038809, dated Jan. 16, 2018, with an English translation.
Written Opinion of the International Searching Autority issued by the Japan Patent Office for corresponding International Patent Application No. PCT/JP2017/038809, dated Jan. 16, 2018, with a partial English translation.
Catt, "Grant-free UL transmission procedure", Agenda Item: 6.1.3.3.3, 3GPP TSG-RAN WG1 Meeting #90, R1-1712414, Prague, Czechia, Aug. 21-25, 2017.
Intel Corporation, "Uplink URLLC Transmission without Grant", Agenda Item: 5.1.3.4, 3GPP TSG-RAN WG1 NR Ad-Hoc Meeting, R1-1700375, Spokane, USA, Jan. 16-20, 2017.
Fujitsu, "Discussions on HARQ for UL data transmission without grant", Agenda Item: 7.3 3.4, 3GPP TSG-RAN WG1 Meeting #90bis, R1-1717721, Prague, Czech Republic, Oct. 9-13, 2017.
Notice of Reasons for Refusal issued by the Japan Patent Office for corresponding Japanese Patent Application No. 2019-549794, dated May 11, 2021, with an English translation.

\* cited by examiner

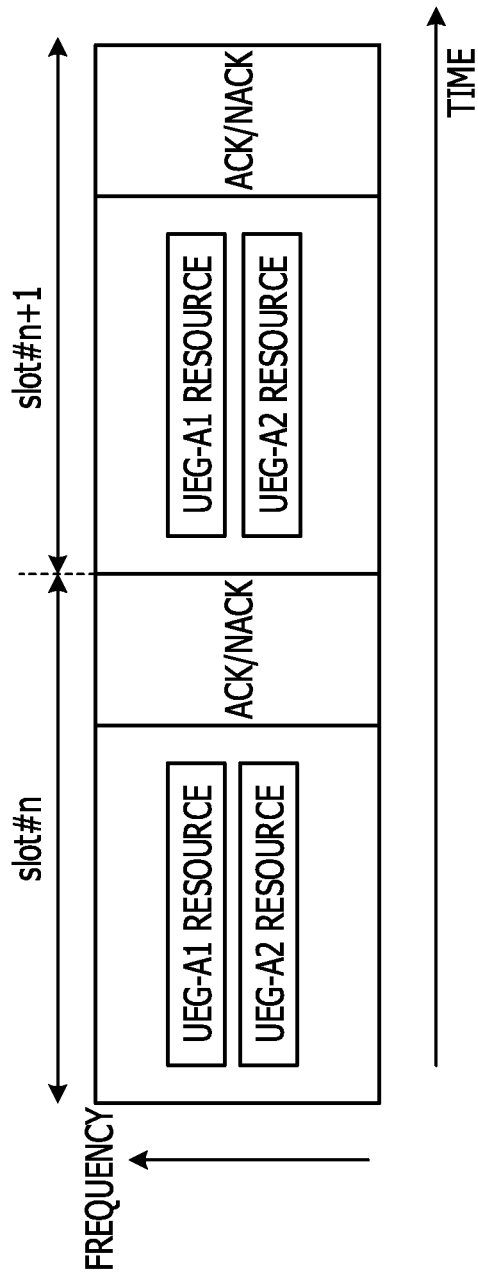

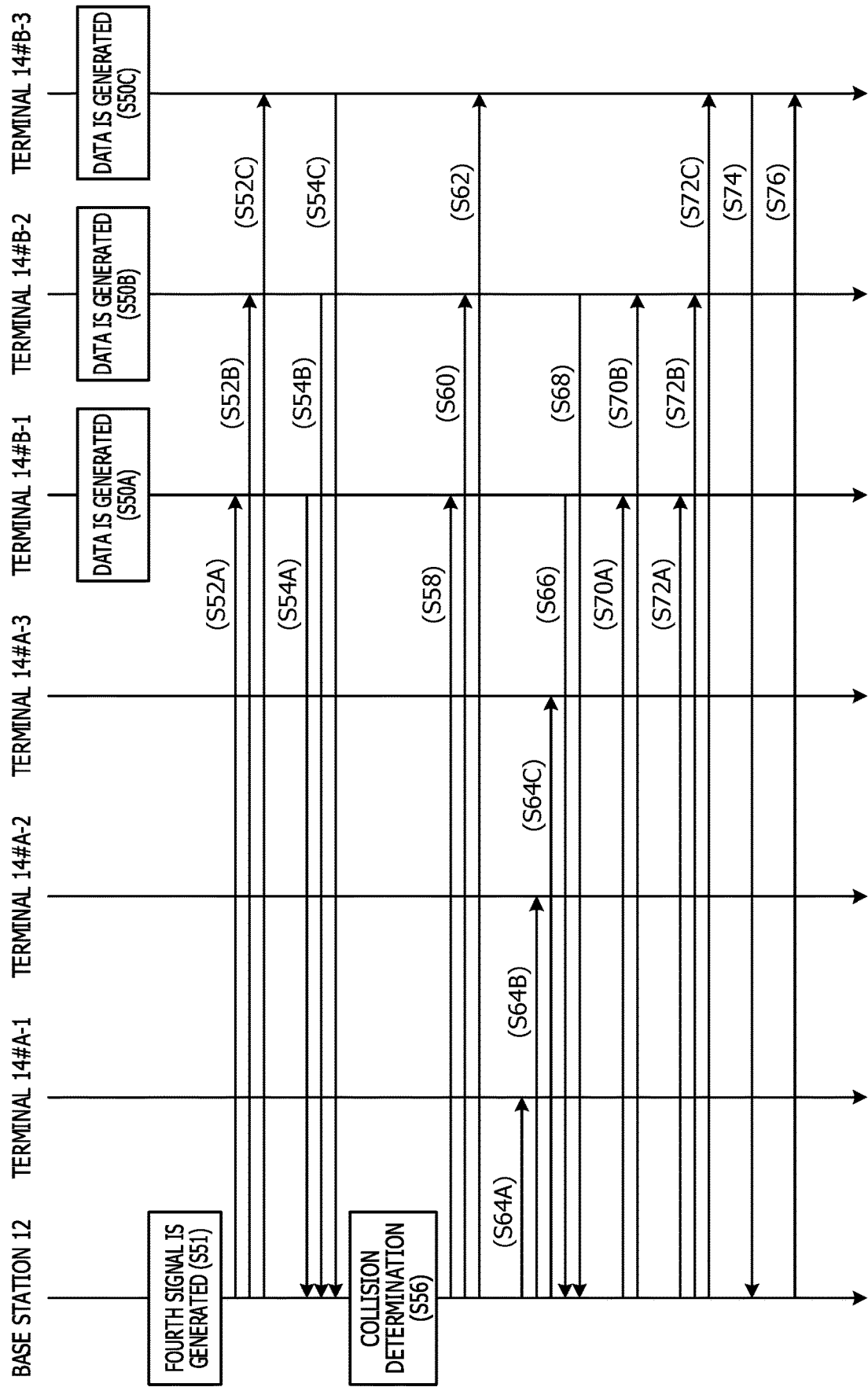

BASE STATION, TERMINAL, COMMUNICATION METHOD, AND WIRELESS COMMUNICATION SYSTEM

CROSS-REFERENCE TO RELATED APPLICATION

This application is a continuation application of International Application PCT/JP2017/038809 filed on Oct. 26, 2017 and designated the U.S., the entire contents of which are incorporated herein by reference.

FIELD

The disclosed technology relates to a base station, a terminal, a communication method, and a wireless communication system.

BACKGROUND

Conventionally, as illustrated in FIG. 13 as an example, when a terminal transmits data to a base station by wireless communication, a Scheduling Request (SR) is transmitted by the terminal before the data transmission. Upon receiving the SR, the base station transmits information including Grant that allows to use an allocated radio resource to the terminal. Upon receiving the information including Grant, the terminal transmits data to the base station by using the allocated radio resource.

With this method, at least before the terminal transmits the data to the base station by wireless communication, it takes time required to transmit the SR to the base station and receive the information including Grant from the base station (part surrounded by a broken line in FIG. 13).

In Third Generation Partnership Project (3GPP), the Grant-free method (or configured-grant transmission method) has been studied in order to shorten the time before data transmission for a wireless communication system of the next generation communication standard (5th Generation (5G)). With the Grant-free method, as illustrated in FIG. 14 as an example, uplink data transmission is possible without transmitting the SR to the base station by the terminal. For the Grant-free method, agreement has been made in the 3GPP such that a radio resource used for data transmission by the terminal is allocated to each terminal or each terminal group in advance. In the method, the radio resource can be a periodic radio resource that is disposed with a constant time interval in the time domain. Information regarding the radio resource to be allocated to the terminal (for example, position on time domain, time period, position on frequency domain, or the like) is notified to each terminal in advance by using upper layer signaling (e.g. RRC signaling).

Examples of the related art include 3GPP TSG RAN WG1 Meeting #88, R1-1701594, Athens Greece, "Basic Grant-free Transmission for URLLC", 13-17 Feb. 2017 and 3GPP TSG RAN WG1 Meeting #88, R1-1703788, Athens Greece, "WF on grant-free for UL URLLC", 13-17 Feb. 2017.

SUMMARY

According to an aspect of the embodiments, a base station capable of performing wireless communication with a wireless communication device with a Grant-free method, the base station includes: a reception circuit configured to receive a first signal transmitted from the wireless communication device by using a shared radio resource allocated to the wireless communication device; and a transmission circuit configured to transmit a second signal including information regarding a radio resource used for retransmission to the wireless communication device when retransmission of the first signal is requested to the wireless communication device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8A illustrates a conceptual diagram of a slot according to the second embodiment;

FIG. 12B illustrates a chart illustrating an example of a flow of processing of a wireless communication system according to the fourth embodiment;

DESCRIPTION OF EMBODIMENT(S)

In a case where the same radio resource is shared and concurrently used by the plurality of terminals in the data transmission from the terminal to the base station with the Grant-free method, collision of the pieces of data transmitted from the plurality of terminals can occur, and the collision can affect data reception by the base station. In this case, collision of the pieces of data further can occur even when the data is retransmitted from each terminal, and the number of retransmission can increase.

An object of one aspect of the disclosed technology is to reduce the number of retransmission.

As one aspect, an effect that the number of retransmission can be reduced is obtained.

Hereinafter, an example of embodiments of the disclosed technology will be described in detail with reference to the drawings.

First Embodiment

Figure 1:
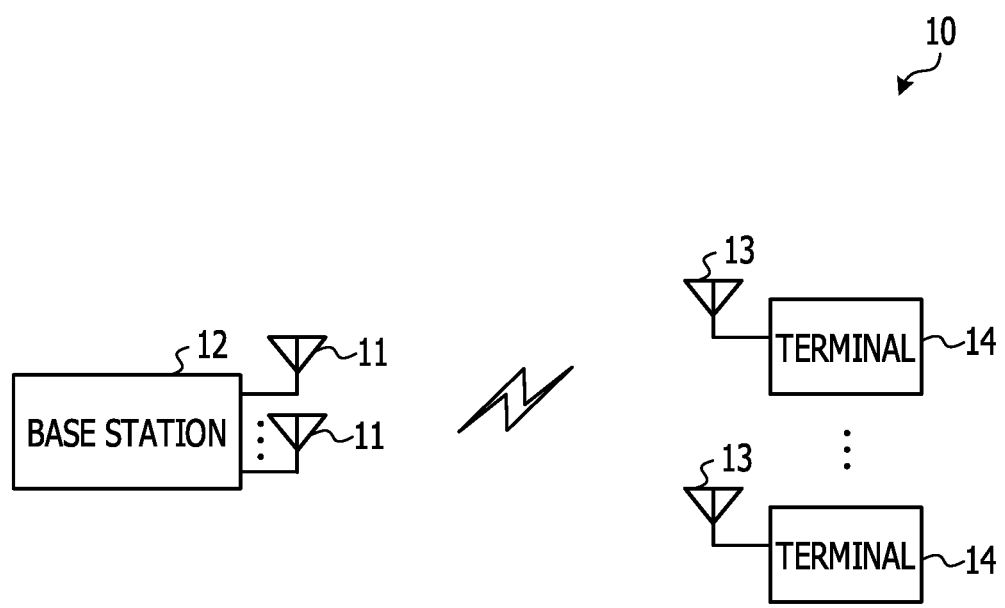
FIG. 1 illustrates a block diagram illustrating a schematic configuration of a wireless communication system according to each embodiment.

First, a configuration of a wireless communication system 10 according to the present embodiment will be described with reference to FIG. 1. As illustrated in FIG. 1, the wireless communication system 10 includes a base station 12 including a plurality of antenna elements 11 and a plurality of terminals 14 each including a single antenna element 13. The terminal 14 is also referred to as User Equipment (UE). Note that the terminal 14 may include the plurality of antenna elements 13.

Each of the plurality of terminals 14 is positioned in an area covered by the base station 12 and can wirelessly communicate with the base station 12. The base station 12 and the terminal 14 can wirelessly communicate with each other with the Grant-free method. To implement the wireless communication with the Grant-free method, a radio resource shared by the plurality of terminals 14 used when the terminal 14 transmits data to the base station 12 is allocated to each terminal 14 by the base station 12. Note that the shared radio resource is allocated and indicated to the plurality of terminals, for example, by using a System-Information-Block (SIB) or RRC signaling. The terminal 14 is an example of a wireless communication device according to the disclosed technology.

Figure 2:
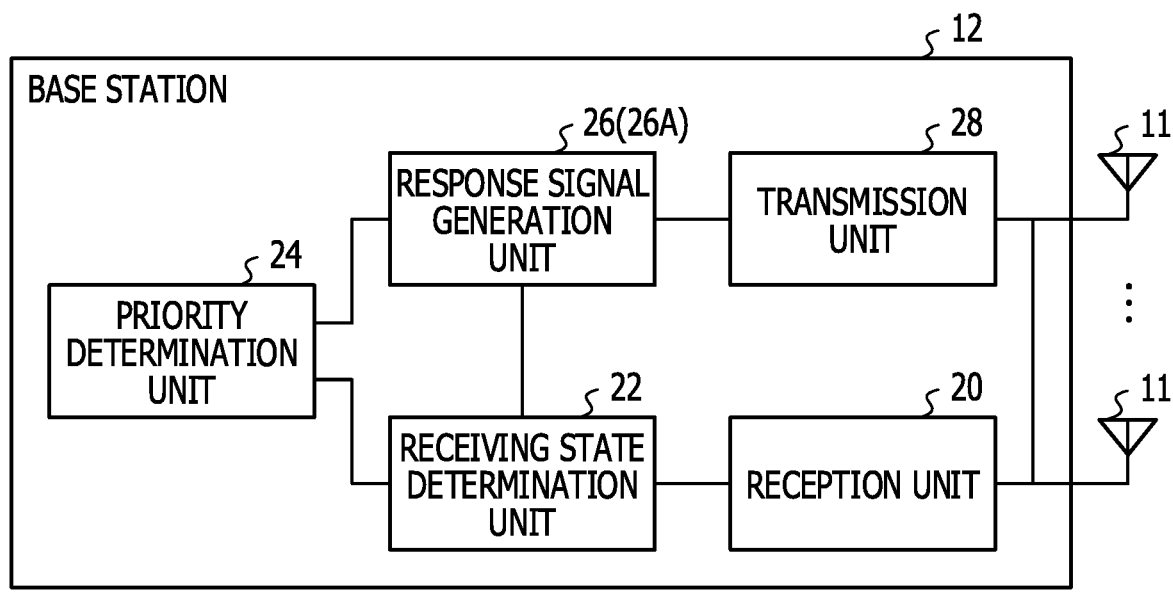
FIG. 2 illustrates a functional block diagram of a base station according to a first and a second embodiments.

FIG. 2 describes a functional configuration of the base station 12 according to the present embodiment. In FIG. 2, the base station 12 includes a reception unit 20, a receiving state determination unit 22, a priority determination unit 24, a response signal generation unit 26, and a transmission unit 28.

The reception unit 20 receives a signal, which is transmitted from the terminal 14 via the antenna element 13, via the antenna element 11. In the present embodiment, the reception unit 20 receives a first signal, including data to be transmitted by the terminal 14. Then, the reception unit 20 executes processing such as analog-to-digital signal conversion and fast Fourier transform.

The receiving state determination unit 22 determines whether or not the first signal can be normally received on the basis of a receiving state of the first signal on which the reception processing has been executed by the reception unit 20. Note that the receiving state determination unit 22 determines whether or not the first signal can be normally received, for example, by executing Hybrid ARQ (HARQ) processing. When each of the plurality of terminals 14 transmits the first signal at the same timing by using the allocated shared radio resource, there is a possibility that the reception unit 20 receives the first signal affected by interference. Therefore, in the present embodiment, the receiving state determination unit 22 determines whether or not the first signal cannot be normally received and collision of the first signals occurs because the plurality of terminals 14 transmits the first signals at the same timing, according to the receiving state of the first signal on which the reception processing has been executed by the reception unit 20. Note that, in a case where all the first signals received in a certain slot can be normally received, it is not necessary for the receiving state determination unit 22 to make the collision determination.

Furthermore, in a case of determining that the collision of the first signals occurs, the receiving state determination unit 22 specifies the plurality of terminals 14 that is a transmission source of the first signal by using each first signal of which the reception processing has been executed by the reception unit 20.

In a case where the receiving state determination unit 22 determines that the collision of the first signals occurs, the priority determination unit 24 determines priority of retransmission of the first signal by the plurality of terminals 14 that is the transmission source of the first signal specified by the receiving state determination unit 22. In the present embodiment, the priority determination unit 24 determines the priority of the retransmission of the first signal in two stages, for example, according to the Quality of Service (QoS) predetermined for each terminal 14. Specifically, the priority determination unit 24 determines that a terminal 14 having the highest QoS among the plurality of terminals 14 that is the transmission source of the first signal has the highest priority and the terminal 14 other than the terminal 14 having the highest QoS has low priority.

Note that the priority determination unit 24 may determine that a terminal 14, of which a timing at which the reception unit 20 starts to receive the first signal is the earliest, has high priority among the plurality of terminals 14 that is the transmission source of the first signal and the terminal 14 other than the terminal 14 of which the above timing is the earliest has low priority.

Furthermore, when determining that at least a single terminal 14 among the plurality of terminals 14 that is the transmission source of the first signal has high priority and at least a single terminal 14 has low priority, the priority determination unit 24 may determine that the plurality of terminals 14 has high priority. For example, the priority determination unit 24 may determine that the terminal 14 of which the QoS is equal to or higher than a predetermined value has high priority and the terminal 14 of which the QoS is less than the predetermined value has low priority.

The response signal generation unit 26 generates a second signal as a response to the first signal transmitted from the terminal 14. In the present embodiment, when the receiving state determination unit 22 determines that the first signal can be normally received, the response signal generation unit 26 generates ACKnowledgement (ACK) indicating that the first signal can be normally received as the second signal.

Furthermore, when the receiving state determination unit 22 determines that the first signal cannot be normally received, the response signal generation unit 26 generates Negative ACKnowledgement (NACK) requesting retransmission to the terminal 14 that is the transmission source of the first signal according to the Hybrid Automatic Repeat reQuest (HARQ) as the second signal. In the present embodiment, the response signal generation unit 26 includes information regarding the radio resource used to retransmit the first signal by the terminal 14 that is the transmission source of the first signal in NACK. Specifically, the response signal generation unit 26 generates NACK according to the priority of the retransmission by the priority determination unit 24 for each terminal 14 that is the transmission source of the first signal.

More specifically, the response signal generation unit 26 generates NACK (hereinafter, referred to as "NACK0") including information indicating that retransmission at a first transmission timing (for example, next transmission timing) cannot be performed to the terminal 14 of which the priority of the retransmission is determined to be low by the priority determination unit 24. On the other hand, the response signal generation unit 26 generates NACK (hereinafter, referred to as "NACK1") including information indicating that the retransmission at the first transmission timing can be performed to the terminal 14 of which the priority of the retransmission is determined to be high by the priority determination unit 24.

The transmission unit 28 executes determined transmission processing such as inverse fast Fourier transform, processing for converting a digital signal into an analog signal, or the like on the second signal generated by the response signal generation unit 26. Then, the transmission unit 28 transmits the second signal on which the transmission processing has been executed to the terminal 14 that is the transmission source of the corresponding first signal via the antenna element 11.

Figure 3:
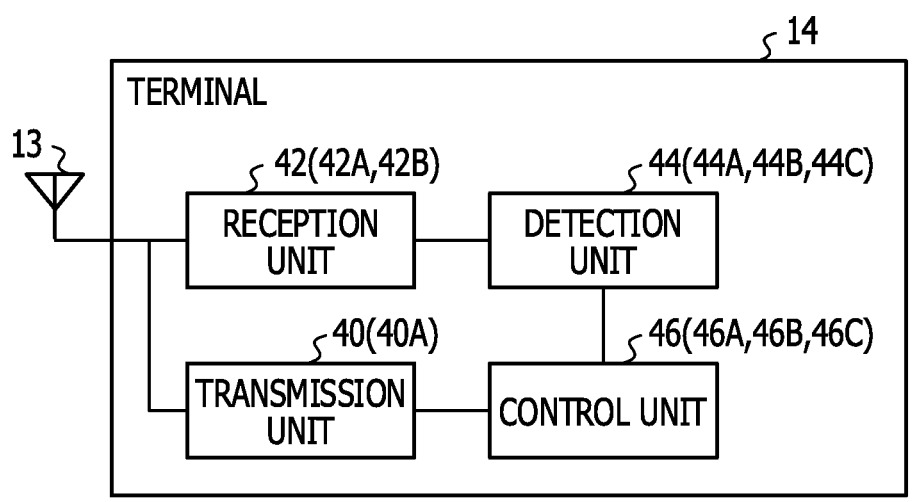
FIG. 3 illustrates a functional block diagram of a terminal according to each embodiment.

Next, a functional configuration of the terminal 14 according to the present embodiment will be described with reference to FIG. 3. As illustrated in FIG. 3, the terminal 14 includes a transmission unit 40, a reception unit 42, a detection unit 44, and a control unit 46.

The transmission unit 40 includes a transmission buffer. When data generated in an upper layer of an application and the like is input, the transmission unit 40 temporarily holds the input data in the transmission buffer. Furthermore, the transmission unit 40 transmits the first signal including the data held in the transmission buffer to the base station 12 via the antenna element 13 by using the shared radio resource allocated to the terminal 14 under control by the control unit 46 to be described later. In the present embodiment, the transmission unit 40 executes determined transmission processing such as inverse fast Fourier transform, processing for converting a digital signal into an analog signal, or the like on the first signal. Then, the transmission unit 40 transmits the first signal on which the transmission processing has been executed to the base station 12 via the antenna element 13.

Furthermore, when a first signal retransmission instruction and a first signal retransmission timing are input from the control unit 46, the transmission unit 40 retransmits the first signal including the data held in the transmission buffer to the base station 12 via the antenna element 13 in accordance with the input retransmission timing.

The reception unit 42 receives the signal transmitted from the base station 12 via the antenna element 11 via the antenna element 13. In the present embodiment, the reception unit 42 receives the second signal transmitted from the base station 12 via the antenna element 11 via the antenna element 13. Then, the reception unit 42 executes determined reception processing such as processing for converting an analog signal into a digital signal, fast Fourier transform, or the like on the received second signal.

The detection unit 44 detects whether the second signal, on which the reception processing has been executed by the reception unit 42, is ACK, NACK0, or NACK1.

In a case where data is generated in the upper layer of the application or the like, the control unit 46 controls the transmission unit 40 to transmit the first signal including the generated data to the base station 12 by using the shared radio resource allocated to the terminal 14. Furthermore, when the detection unit 44 detects that the second signal is ACK, the control unit 46 notifies of the upper layer that the transmission of the first signal is normally completed.

Furthermore, when the detection unit 44 detects that the second signal is NACK0, the control unit 46 outputs an instruction to the transmission unit 40 to retransmit the first signal at a second transmission timing different from the first transmission timing (for example, timing N slots after first transmission timing (N is integer)) without retransmitting the first signal at the first transmission timing. Furthermore, when the detection unit 44 detects that the second signal is NACK1, the control unit 46 outputs an instruction to the transmission unit 40 to retransmit the first signal at the first transmission timing.

Figure 4:
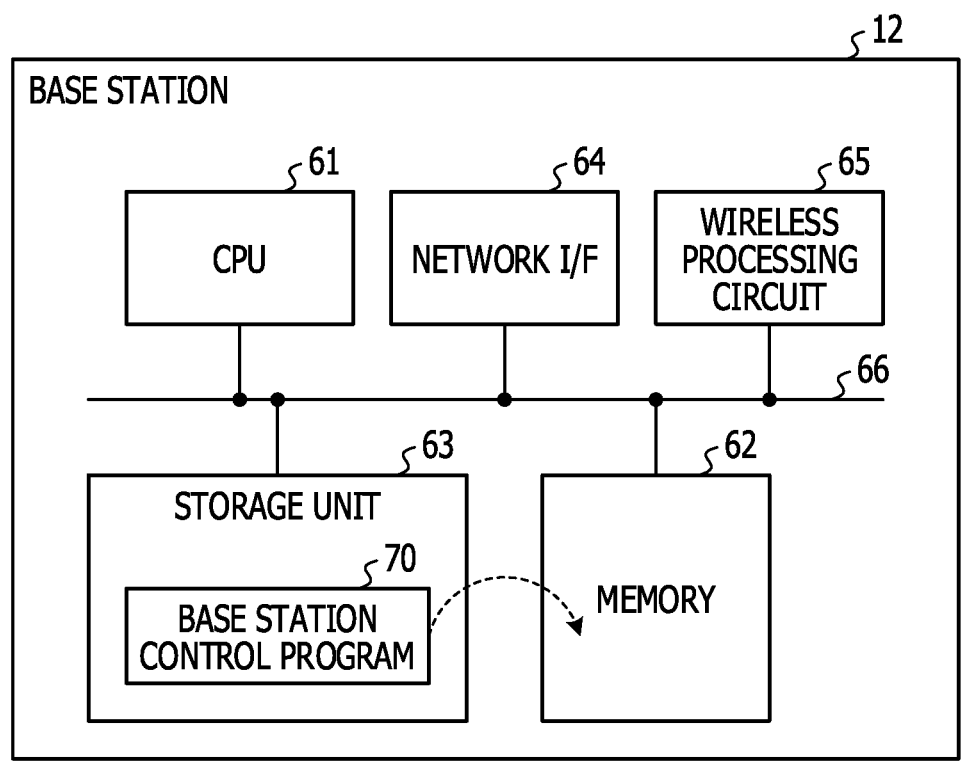
FIG. 4 illustrates a block diagram illustrating a hardware configuration of the base station according to each embodiment.

Next, a hardware configuration of the base station 12 according to the present embodiment will be described with reference to FIG. 4. As illustrated in FIG. 4, the base station 12 includes a Central Processing Unit (CPU) 61, a memory 62 as a temporary storage region, and a nonvolatile storage unit 63. Furthermore, the base station 12 includes a network I/F 64 connected to a core network or the like and a wireless processing circuit 65. The CPU 61, the memory 62, the storage unit 63, the network I/F 64, and the wireless processing circuit 65 are connected to each other via a bus 66.

The storage unit 63 can be implemented by a Hard Disk Drive (HDD), a Solid State Drive (SSD), a flash memory, or the like. The storage unit 63 as a storage medium stores a base station control program 70. The CPU 61 reads the base station control program 70 from the storage unit 63 and develops the read base station control program 70 in the memory 62, and then, executes the base station control program 70. By executing the base station control program 70, the CPU 61 functions as the receiving state determination unit 22, the priority determination unit 24, and the response signal generation unit 26 illustrated in FIG. 2. Furthermore, the reception unit 20 and the transmission unit 28 are implemented by the wireless processing circuit 65. Note that the CPU 61 is a hardware processor.

Furthermore, functions implemented by the base station control program 70 can also be implemented, for example, by a semiconductor integrated circuit, in more detail, an Application Specific Integrated Circuit (ASIC) or the like.

Figure 5:
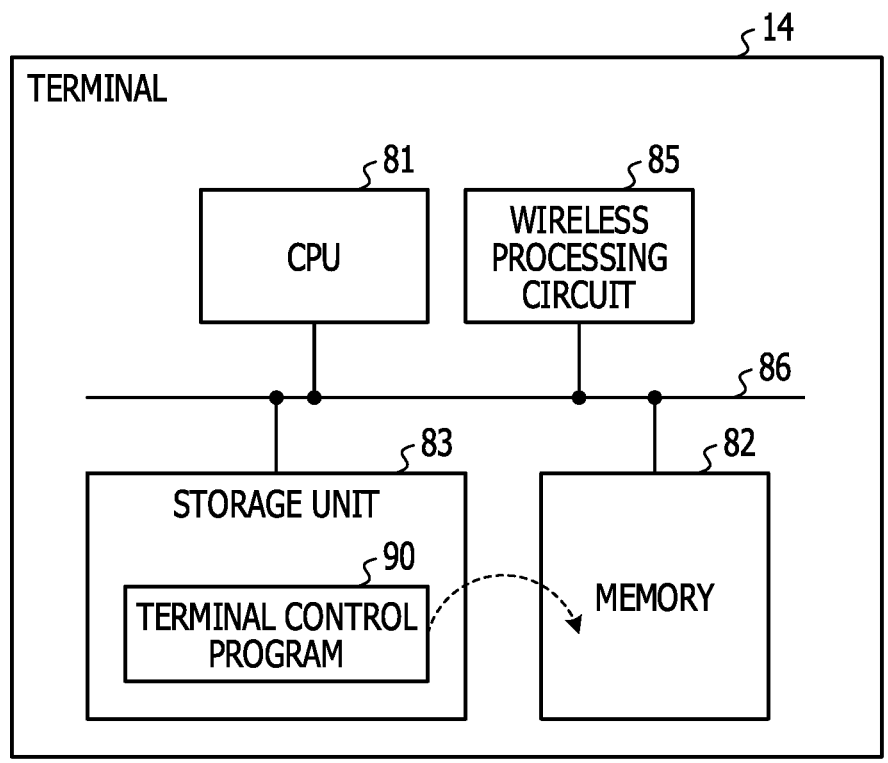
FIG. 5 illustrates a block diagram illustrating a hardware configuration of the terminal according to each embodiment.

Next, a hardware configuration of the terminal 14 according to the present embodiment will be described with reference to FIG. 5. As illustrated in FIG. 5, the terminal 14 includes a CPU 81, a memory 82 as a temporary storage region, a nonvolatile storage unit 83, and a wireless processing circuit 85. The CPU 81, the memory 82, the storage unit 83, and the wireless processing circuit 85 are connected to each other via a bus 86.

The storage unit 83 can be implemented by a flash memory or the like. The storage unit 83 as a storage medium stores a terminal control program 90. The CPU 81 reads the terminal control program 90 from the storage unit 83 and develops the read terminal control program 90 in the memory 82, and then, executes the terminal control program 90. By executing the terminal control program 90, the CPU 81 functions as the detection unit 44 and the control unit 46 illustrated in FIG. 3. Furthermore, the transmission unit 40 and the reception unit 42 are implemented by the wireless processing circuit 85. Note that the CPU 81 is a hardware processor.

Furthermore, the function implemented by the terminal control program 90 can also be implemented by a semiconductor integrated circuit, for example, and more specifically, by an ASIC or the like.

Figure 6A:
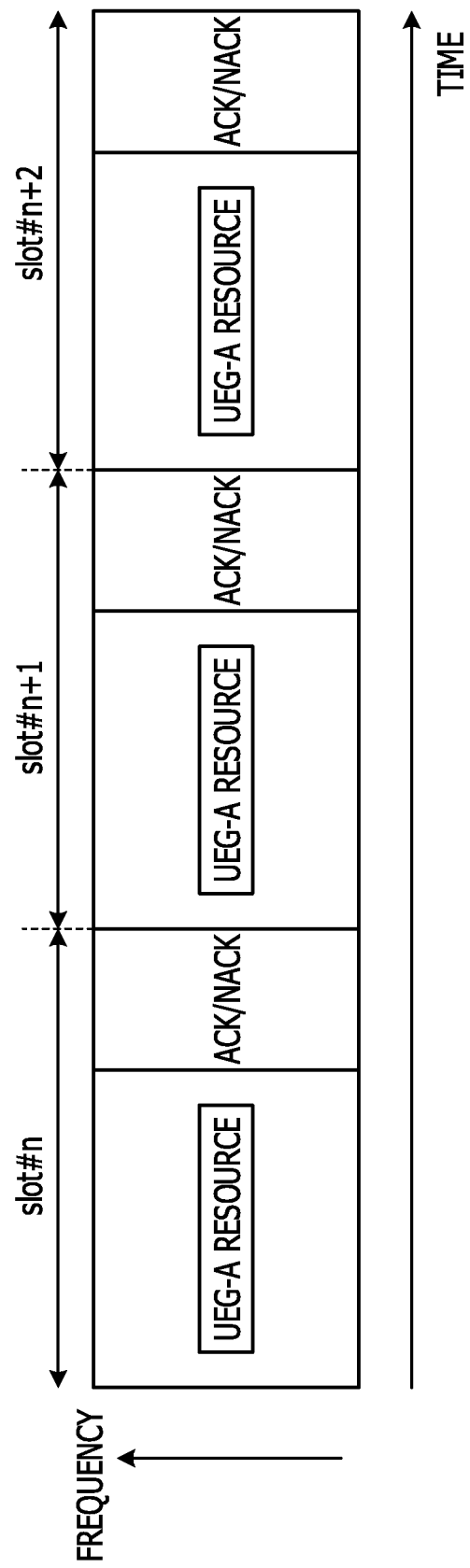
FIG. 6A illustrates a conceptual diagram of a slot according to the first embodiment.

Next, an operation of the wireless communication system 10 according to the present embodiment will be described with reference to FIGS. 6A and 6B. Note that, in the present embodiment, as an example, a case will be described where the shared radio resource is allocated in advance to two terminals 14 as a same group. Furthermore, in the present embodiment, when the two terminals 14 are distinguished from each other, one is described as a terminal 14 #A-1, and another one is described as a terminal 14 #A-2.

Figure 6B:
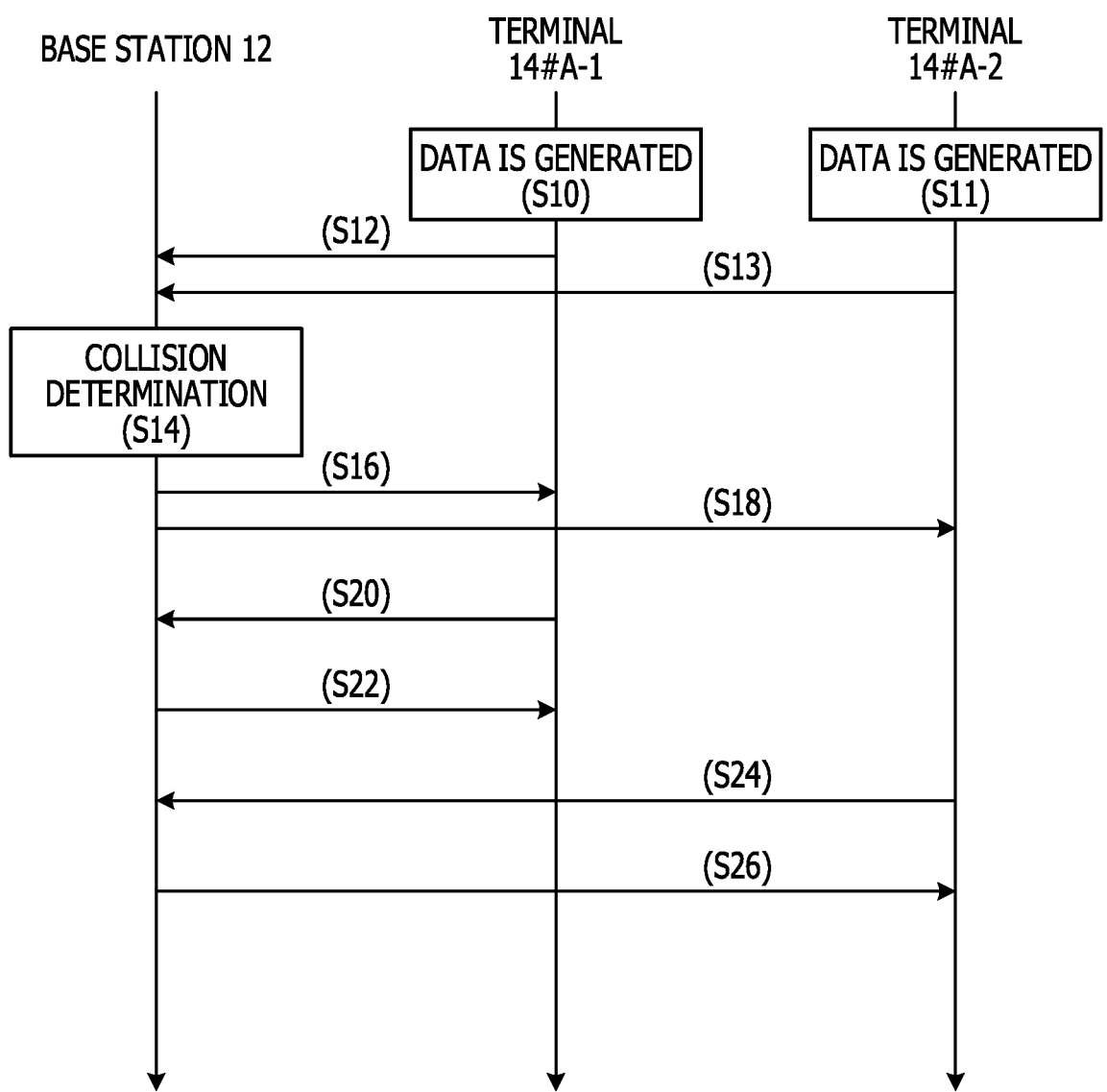
FIG. 6B illustrates a chart illustrating an example of a flow of processing of a wireless communication system according to the first embodiment.

Note that FIG. 6B illustrates a chart of processing of the base station 12 and the terminals 14 #A-1 and 14 #A-2. Furthermore, FIG. 6A illustrates a conceptual diagram of each slot, a vertical direction indicates a frequency axis, and a horizontal direction indicates a time axis. Furthermore, in the present embodiment, a n-th slot is described as a slot #n (slot #n). In other words, for example, a slot following to the slot #n is described as a slot #n+1. Furthermore, a "UEG-A resource" in FIG. 6A indicates a shared radio resource allocated to both of the terminals 14 #A-1 and 14 #A-2 in each slot. Furthermore, "ACK/NACK" in FIG. 6A indicates a timing at which the second signal corresponding to the first signal transmitted from the terminal 14 by using the "UEG-A resource" of each slot is transmitted from the base station 12 to the terminal 14.

Figure 7:
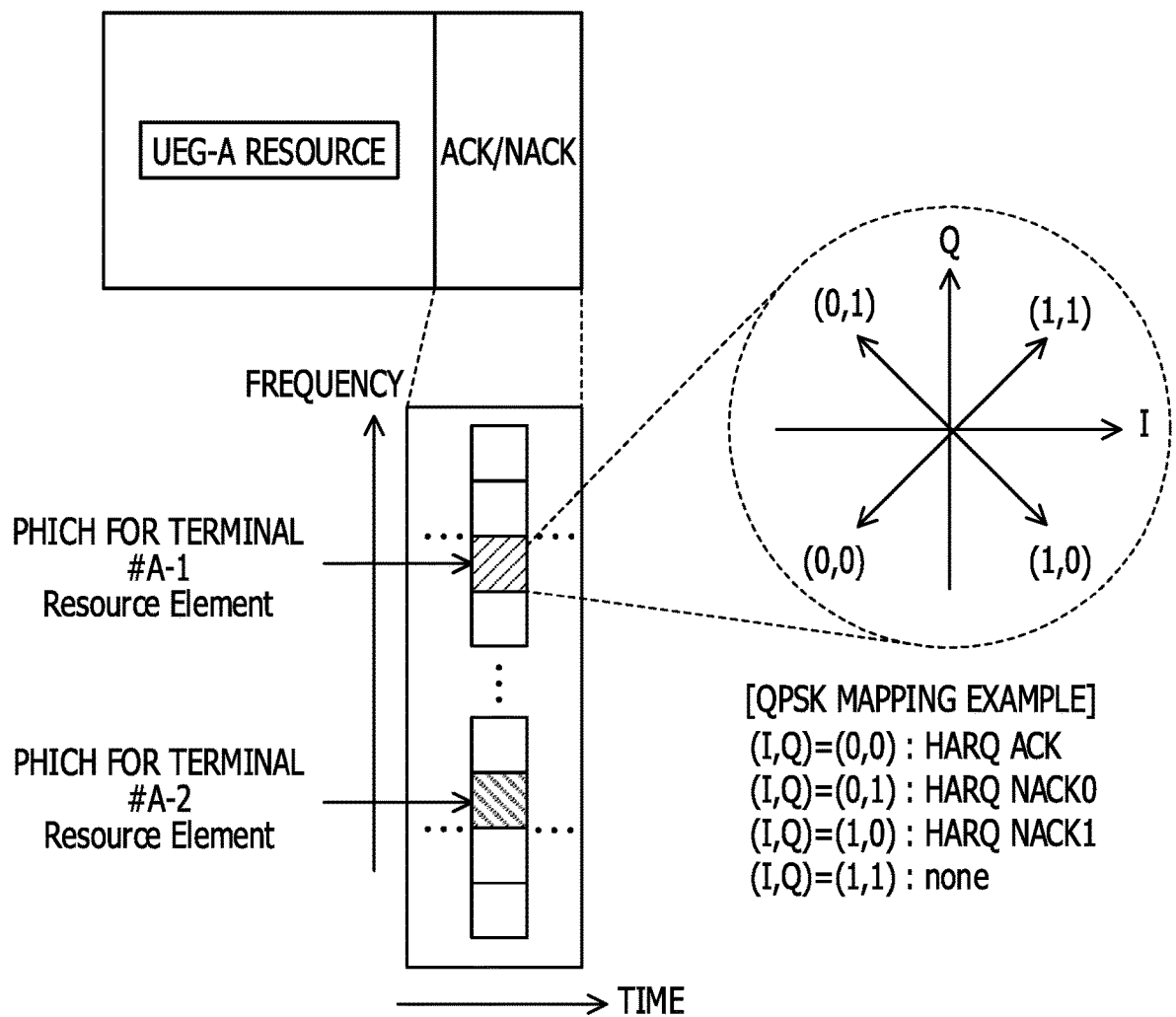
FIG. 7 illustrates a diagram for explaining a second signal according to the first embodiment.

FIG. 7 illustrates an example of allocation of the radio resources of the second signal. As illustrated in FIG. 7, in the present embodiment, a Resource Element (RE) is allocated to each of the terminals 14 #A-1 and 14 #A-2 as the radio resource for the second signal. Furthermore, when transmitting the second signal to the terminal 14, the base station 12 makes any one piece of information obtained by mapping two-bit bit strings different each other to ACK, NACK0, and NACK1 by Quadrature Phase Shift Keying (QPSK) be included in the second signal. Therefore, the terminal 14 can determine, from the received second signal, whether or not the transmission of the first signal is normally completed or whether or not the retransmission of the first signal is requested. Furthermore, when the retransmission of the first signal is requested, the terminal 14 can determine a radio resource used to transmit the first signal and a timing at which the first signal should be retransmitted. Note that, in FIG. 7, a case where the QPSK is used has been described as an example. However, another modulation method (for example, BPSK, QAM, or the like) may be used.

In steps S10 and S11 illustrated in FIG. 6B, in each of the terminals 14 #A-1 and 14 #A-2, the data to be transmitted is generated in the upper layer, and the data is input to the transmission unit 40. The transmission unit 40 temporarily holds the input data in the transmission buffer. Furthermore, the control unit 46 controls the transmission unit 40 to transmit the first signal including the generated data to the base station 12 by using the shared radio resource allocated to the terminal 14. Note that the data generation timings (S10 and S11) of the terminals 14 #A-1 and 14 #A-2 may be the same or different.

In steps S12 and S13, as described above, the transmission unit 40 of each of the terminals 14 #A-1 and 14 #A-2 transmits the first signal to the base station 12 by using the shared radio resource of the slot #n allocated to each terminal 14 under the control by the control unit 46. The reception unit 20 of the base station 12 receives the first signals transmitted from the terminals 14 #A-1 and 14 #A-2 in steps S12 and S13.

Regarding the first signals respectively transmitted from the terminals 14 #A-1 and 14 #A-2 in steps S12 and S13, since a radio resource (shared radio resource) in a same frequency band in the slot #n is used, reception quality of the first signal in the base station 12 is deteriorated by interference. Therefore, in step S14, the receiving state determination unit 22 of the base station 12 determines that the collision of the first signals occurs as described above.

Furthermore, as described above, the receiving state determination unit 22 specifies the terminals 14 #A-1 and 14 #A-2 that are transmission sources of the first signal received by the reception unit 20.

Furthermore, the priority determination unit 24 determines priority of retransmission of the first signals of the terminals 14 #A-1 and 14 #A-2 specified by the receiving state determination unit 22. Note that, here, a case will be described where the priority determination unit 24 determines that the terminal 14 #A-1 has high priority and the terminal 14 #A-2 has low priority.

Then, the response signal generation unit 26 generates NACK1 for the terminal 14 #A-1 determined to have high priority by the priority determination unit 24 and generates NACK0 for the terminal 14 #A-2 determined to have low priority by the priority determination unit 24.

In step S16, the transmission unit 28 transmits NACK1 generated by the response signal generation unit 26 to the terminal 14 #A-1 as described above. Furthermore, in step S18, the transmission unit 28 transmits NACK0 generated by the response signal generation unit 26 to the terminal 14 #A-2 as described above.

The reception unit 42 of the terminal 14 #A-1 receives NACK1 transmitted from the base station 12 in step S16. In other words, the detection unit 44 of the terminal 14 #A-1 detects that the second signal is NACK1, and the control unit 46 outputs an instruction to retransmit the first signal at the first transmission timing (slot #n+1 in present embodiment) to the transmission unit 40. Then, in step S20, the transmission unit 40 of the terminal 14 #A-1 retransmits the first signal to the base station 12 by using a radio resource of the slot #n+1 as described above.

The first signal transmitted from the terminal 14 #A-1 in step S20 is normally received by the base station 12, and the receiving state determination unit 22 of the base station 12 determines that the first signal can be normally received. In other words, the response signal generation unit 26 of the base station 12 generates ACK for the terminal 14 #A-1. Then, in step S22, the transmission unit 28 transmits ACK generated by the response signal generation unit 26 to the terminal 14 #A-1 as described above.

The reception unit 42 of the terminal 14 #A-2 receives NACK0 transmitted from the base station 12 in step S18. In other words, the detection unit 44 of the terminal 14 #A-2 detects that the second signal is NACK0, and the control unit 46 outputs an instruction to retransmit the first signal at the second transmission timing (slot #n+2 in present embodiment) without retransmitting the first signal at the first transmission timing, to the transmission unit 40. Then, in step S24, the transmission unit 40 of the terminal 14 #A-2 retransmits the first signal to the base station 12 by using a radio resource of the slot #n+2 as described above.

The first signal transmitted from the terminal 14 #A-2 in step S24 is normally received by the base station 12, and the receiving state determination unit 22 of the base station 12 determines that the first signal can be normally received. In other words, the response signal generation unit 26 of the base station 12 generates ACK for the terminal 14 #A-2. Then, in step S26, the transmission unit 28 transmits ACK generated by the response signal generation unit 26 to the terminal 14 #A-2 as described above.

As described above, according to the present embodiment, when the base station 12 requests to retransmit the first signal, the information regarding the radio resource used for retransmission is included in the second signal. Furthermore, the information regarding the radio resource used for retransmission includes information indicating whether or not retransmission at the first transmission timing can be performed. Therefore, as a result of suppressing occurrence of the collision at the time of the retransmission, a possibility that the retransmission occurs is reduced, and an increase in a transmission delay time can be suppressed.

Note that, in the example in FIG. 6, a case has been described where the number of terminals 14 to which the shared radio resource is allocated is two. However, the present invention is not limited to this. The number of terminals 14 to which the shared radio resource is allocated may be equal to or more than three. A form is exemplified in which the base station 12 transmits NACK1 to a single terminal 14 and transmits NACK0 to the other terminals 14 when the first signals are transmitted from the three or more terminals 14 by using the shared radio resource at the same timing. In this case, there is a possibility that the collision occurs again when the other terminals 14 retransmit the first signals. However, by similarly repeating the processing for transmitting NACK0 and NACK1 to the terminals 14, the collision is finally prevented.

Furthermore, in the present embodiment, a case has been described where the information indicating where or not the retransmission can be performed at the first transmission timing is included in the second signal. However, the present invention is not limited to this. For example, a form may be used in which information indicating how many slots after which retransmission can be performed is included in the second signal. In this case, for example, when the first signals are transmitted from the three terminals 14 by using the shared radio resource at the same timing, a second signal which includes information indicating that retransmission can be performed in a slot after one slot (slot #n+1 in example in FIG. 6) is transmitted to the first terminal 14 of the three terminals 14. Furthermore, in this case, the second signal including information indicating that retransmission can be performed in a slot two slots later is transmitted to the second terminal 14 of the three terminals. Moreover, in this case, the second signal including information indicating that retransmission can be performed in a slot three slots later is transmitted to the third terminal 14 of the three terminals.

Furthermore, when the first signal transmitted by the terminal 14 #A-1 in step S20 is not normally received by the base station 12 due to an influence of wireless environment or the like, a NACK signal including a transmission timing different from a transmission timing of the terminal 14 #A-2 (second transmission timing) may be transmitted as a NACK signal to the terminal 14 #A-1. In this way, the retransmission of the retransmission of the terminal 14 #A-1 and the retransmission of the terminal 14 #A-2 can be separately performed at different transmission timings (transmission slot). Note that, for preferential communication of the terminal 14 #A-1, for example, when NACK for the first signal transmitted at the first timing is transmitted to the terminal 14 #A-1, instruction information to further change the transmission timing may be transmitted to the terminal 14 #A-2. Furthermore, when transmitting ACK for the first signal transmitted at the first transmission timing, the base station 12 may transmit instruction information to set an earlier transmission timing of the first signal to the terminal 14 #A-2 that transmits the first signal at the second transmission timing.

Second Embodiment

A second embodiment according to the disclosed technology will be described. Note that, since a configuration of a wireless communication system 10 according to the present embodiment is similar to that in the first embodiment, description thereof is omitted. In the present embodiment, a plurality of (two in present embodiment) radio resources shared by a plurality of terminals 14 used when the terminal 14 transmits data to a base station 12 is allocated to each terminal 14 by the base station 12 in advance. Furthermore, it is assumed that the plurality of radio resources has a different frequency band.

Next, a functional configuration of the base station 12 according to the present embodiment will be described with reference to FIG. 2. Note that a functional unit having the function same as that in the first embodiment is denoted with the same reference as in the first embodiment, and description thereof is omitted. As illustrated in FIG. 2, the base station 12 includes a reception unit 20, a receiving state determination unit 22, a priority determination unit 24, a response signal generation unit 26A, and a transmission unit 28.

The response signal generation unit 26A generates a second signal as a response to the first signal transmitted from the terminal 14. In the present embodiment, when the receiving state determination unit 22 determines that the first signal can be normally received, the response signal generation unit 26A generates ACK indicating that the first signal can be normally received as the second signal.

Furthermore, when the first signal is not normally received by the receiving state determination unit 22, the response signal generation unit 26A generates NACK that requests retransmission to the terminal 14 that is a transmission source of the first signal in accordance with HARQ as the second signal. In the present embodiment, the response signal generation unit 26A includes information regarding a radio resource used to retransmit the first signal by the terminal 14 that is the transmission source of the first signal in NACK.

Specifically, the response signal generation unit 26A generates NACK (hereinafter, referred to as "NACK2") including information indicating that the first signal is retransmitted to the terminal 14 determined to have high priority of retransmission by the priority determination unit 24 by using a radio resource corresponding to the radio resource used for the current transmission of the first signal. Furthermore, the response signal generation unit 26A generates following NACK to the terminal 14 determined to have low priority of retransmission by the priority determination unit 24. In other words, in this case, the response signal generation unit 26A generates NACK (hereinafter, referred to as "NACK3") including information indicating that the first signal is retransmitted by using a radio resource corresponding to a radio resource different from the radio resource that is used for the current transmission of the first signal. Note that the response signal generation unit 26A may generate NACK3 for the terminal 14 determined to have high priority of retransmission by the priority determination unit 24 and generate NACK2 for the terminal 14 determined to have low priority of retransmission.

Next, a functional configuration of the terminal 14 according to the present embodiment will be described with reference to FIG. 3. Note that a functional unit having the function same as that in the first embodiment is denoted with the same reference as in the first embodiment, and description thereof is omitted. As illustrated in FIG. 3, the terminal 14 includes a transmission unit 40, a reception unit 42, a detection unit 44A, and a control unit 46A.

The detection unit 44A detects whether the second signal, on which the reception processing has been executed by the reception unit 42, is ACK, NACK2, or NACK3.

When data is generated in an upper layer of an application or the like, the control unit 46A controls the transmission unit 40 to transmit the first signal including the generated data to the base station 12 by using any one of the shared radio resources allocated to the terminal 14. Furthermore, when the detection unit 44A detects that the second signal is ACK, the control unit 46A notifies of the upper layer that the transmission of the first signal is normally completed.

Furthermore, when the detection unit 44A detects that the second signal is NACK2, the control unit 46A outputs an instruction to the transmission unit 40 to retransmit the first signal by using the radio resource corresponding to the radio resource which is used at this time at the next transmission timing. Furthermore, when the detection unit 44A detects that the second signal is NACK3, the control unit 46A outputs an instruction to the transmission unit 40 to retransmit the first signal by using a radio resource corresponding to a radio resource different from the radio resource which is used in this time at the next transmission timing.

Since hardware configurations of the base station 12 and the terminal 14 are similar to those in the first embodiment (refer to FIGS. 4 and 5), description thereof is omitted.

Next, an operation of the wireless communication system 10 according to the present embodiment will be described with reference to FIGS. 8A and 8B. Note that, in the present embodiment, a case will be described where two shared radio resources are allocated in advance to two terminals 14 as a same group. Furthermore, in the present embodiment, when the two terminals 14 are distinguished from each other, one is described as a terminal 14 #A-1, and another one is described as a terminal 14 #A-2. Furthermore, a "UEG-A1 resource" and a "UEG-A2 resource" in FIG. 8A respectively indicate two shared radio resources allocated to both of the terminals 14 #A-1 and 14 #A-2 in each slot. Furthermore, a step in FIG. 8B in which processing same as that in FIG. 6B is executed is denoted with the same reference, and description thereof is omitted.

Figure 8B:
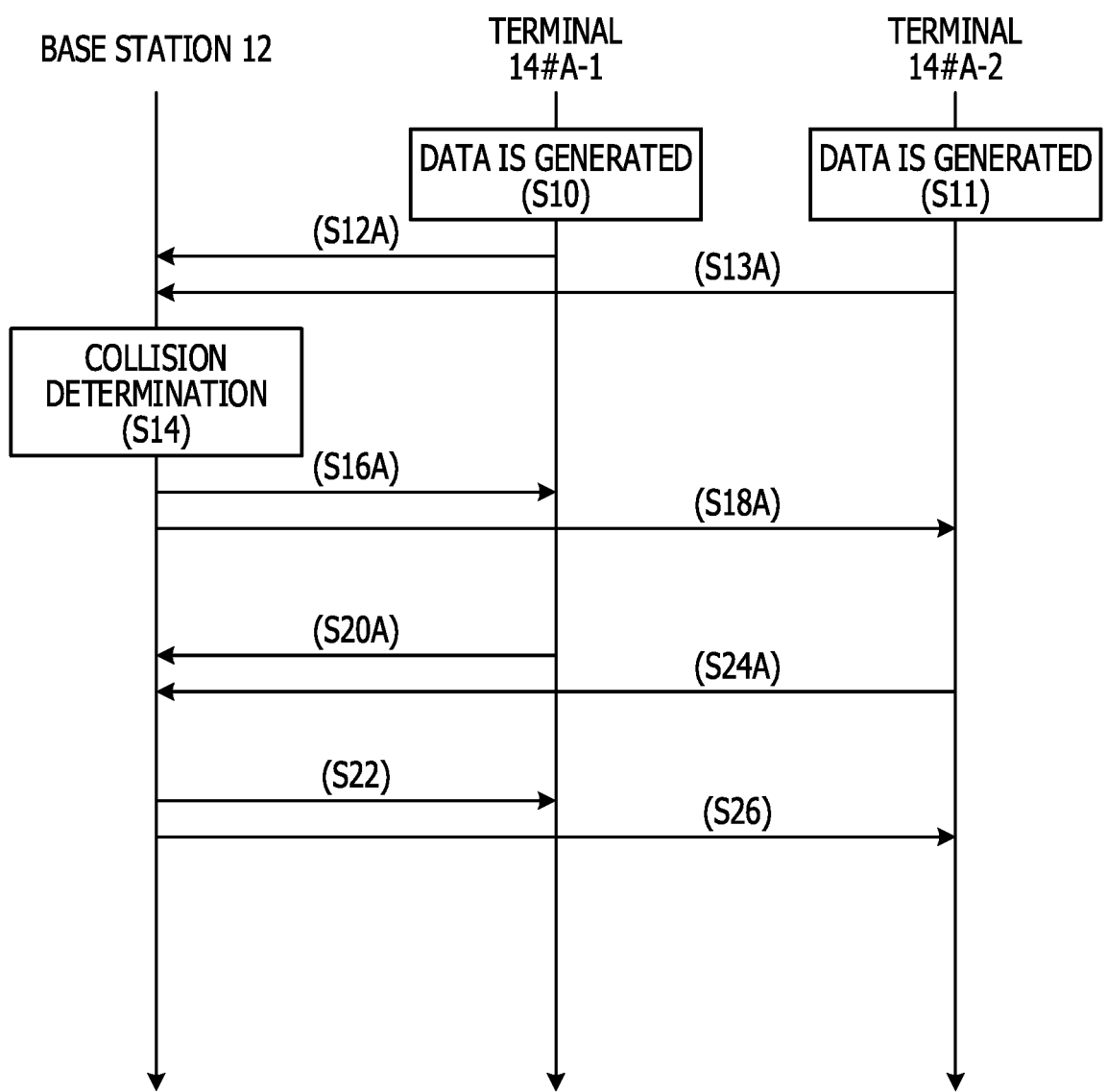
FIG. 8B illustrates a chart illustrating an example of a flow of processing of a wireless communication system according to the second embodiment.

In steps S12A and S13A in FIG. 8B, the transmission units 40 of the terminals 14 #A-1 and 14 #A-2 transmit the first signals to the base station 12 by using any one of shared radio resources in the slot #n allocated to each terminal 14 under the control by the control unit 46A as described above. Note that, here, a case will be described where both of the terminals 14 #A-1 and 14 #A-2 transmit the first signals to the base station 12 by using the UEG-A1 resource in steps S12A and S13A. The reception unit 20 of the base station 12 receives the first signal transmitted from the terminal 14 in steps S12A and S13A.

Regarding the first signals respectively transmitted from the terminals 14 #A-1 and 14 #A-2 in steps S12A and S13A, since a radio resource in a same frequency band is used at the same timing (slot), reception quality of the first signal in the base station 12 is deteriorated by interference. Therefore, the processing by the receiving state determination unit 22 and the priority determination unit 24 of the base station 12 similar to that in the first embodiment is executed in step S14. Then, the response signal generation unit 26A generates NACK2 for the terminal 14 #A-1 determined to have high priority by the priority determination unit 24 and generates NACK3 for the terminal 14 #A-2 determined to have low priority by the priority determination unit 24.

In step S16A, the transmission unit 28 transmits NACK2 generated by the response signal generation unit 26A to the terminal 14 #A-1. Furthermore, in step S18A, the transmission unit 28 transmits NACK3 generated by the response signal generation unit 26A to the terminal 14 #A-2.

The reception unit 42 of the terminal 14 #A-1 receives NACK2 transmitted from the base station 12 in step S16A. In other words, the detection unit 44A of the terminal 14 #A-1 detects that the second signal is NACK2. As a result of the detection, the control unit 46A of the terminal 14 #A-1 outputs an instruction, to the transmission unit 40, to retransmit the first signal by using the radio resource (UEG-A1 resource in present embodiment) corresponding to the radio resource that is used at this time at the first transmission timing (slot #n+1 in present embodiment). Then, in step S20A, the transmission unit 40 of the terminal 14 #A-1 retransmits the first signal to the base station 12 by using the UEG-A1 resource of the slot #n+1 as described above.

The reception unit 42 of the terminal 14 #A-2 receives NACK3 transmitted from the base station 12 in step S18A. In other words, the detection unit 44A of the terminal 14 #A-2 detects that the second signal is NACK3. As a result of the detection, the control unit 46A of the terminal 14 #A-2 outputs an instruction, to the transmission unit 40, to retransmit the first signal by using the radio resource (UEG-A2 resource in present embodiment) corresponding to the radio resource different from the radio resource that is used at this time at the first transmission timing. Then, in step S24A, the transmission unit 40 of the terminal 14 #A-2 retransmits the first signal to the base station 12 by using the UEG-A2 resource of the slot #n+1 as described above.

The first signal transmitted from the terminal 14 #A-1 in step S20A and the first signal transmitted from the terminal 14 #A-2 in step S24A are transmitted by using radio resources in different frequency bands. Therefore, the collision of the first signals does not occur. Therefore, as in the first embodiment, when the base station 12 can normally receive the first signal transmitted from the terminal 14 #A-1 in step S22, the transmission unit 28 transmits ACK to the terminal 14 #A-1. Furthermore, when the base station 12 can normally receive the first signal transmitted from the terminal 14 #A-2 in step S26, the transmission unit 28 transmits ACK to the terminal 14 #A-2.

As described above, according to the present embodiment, when the base station 12 requests to retransmit the first signal, the information regarding the radio resource used for retransmission is included in the second signal. Furthermore, information regarding the radio resource used for the retransmission includes information indicating whether or not a radio resource is a radio resource corresponding to the radio resource that is used at this time or a radio resource corresponding to a radio resource different from the radio resource that is used at this time. Therefore, a transmission delay time can be shortened in comparison with the first embodiment.

Note that the first embodiment and the second embodiment may be combined. For example, forms are exemplified in which the following information is included in the second signal to the terminal 14 in a descending order of the priority of the retransmission.

(1) The first signal can be retransmitted at the next transmission timing, and the first signal is retransmitted by using a radio resource corresponding to the radio resource that is used for transmission of the first signal at this time.

(2) The first signal can be retransmitted at the next transmission timing, and the first signal is retransmitted by using a radio resource corresponding to a radio resource different from the radio resource that is used for transmission of the first signal at this time.

(3) The first signal cannot be retransmitted at the next transmission timing, and the first signal is retransmitted by using a radio resource corresponding to the radio resource that is used for transmission of the first signal at this time.

(4) The first signal cannot be retransmitted at the next transmission timing, and the first signal is retransmitted by using a radio resource corresponding to a radio resource different from the radio resource that is used for transmission of the first signal at this time.

Note that the order of the priority of the retransmission may be an order of (2), (1), (3), (4) or and order of (2), (1), (4), (3).

Third Embodiment

A third embodiment of the disclosed technology will be described. Note that, since a configuration of a wireless communication system 10 according to the present embodiment is similar to that in the second embodiment, description thereof is omitted. In the present embodiment, a terminal 14 belongs to any one of a plurality of groups. Then, for each group, a plurality of shared radio resources used when the terminal 14 transmits data to a base station 12 is allocated in advance by the base station 12. Furthermore, each radio resource has a different frequency band.

In the first and second embodiments, when no terminal 14 uses the shared radio resource, a use efficiency of the radio resource is deteriorated. Therefore, when the allocated radio resource is used, the terminal 14 according to the present embodiment transmits a third signal including information indicating that the allocated radio resource is used to the base station 12 before the transmission of the first signal.

Figure 9:
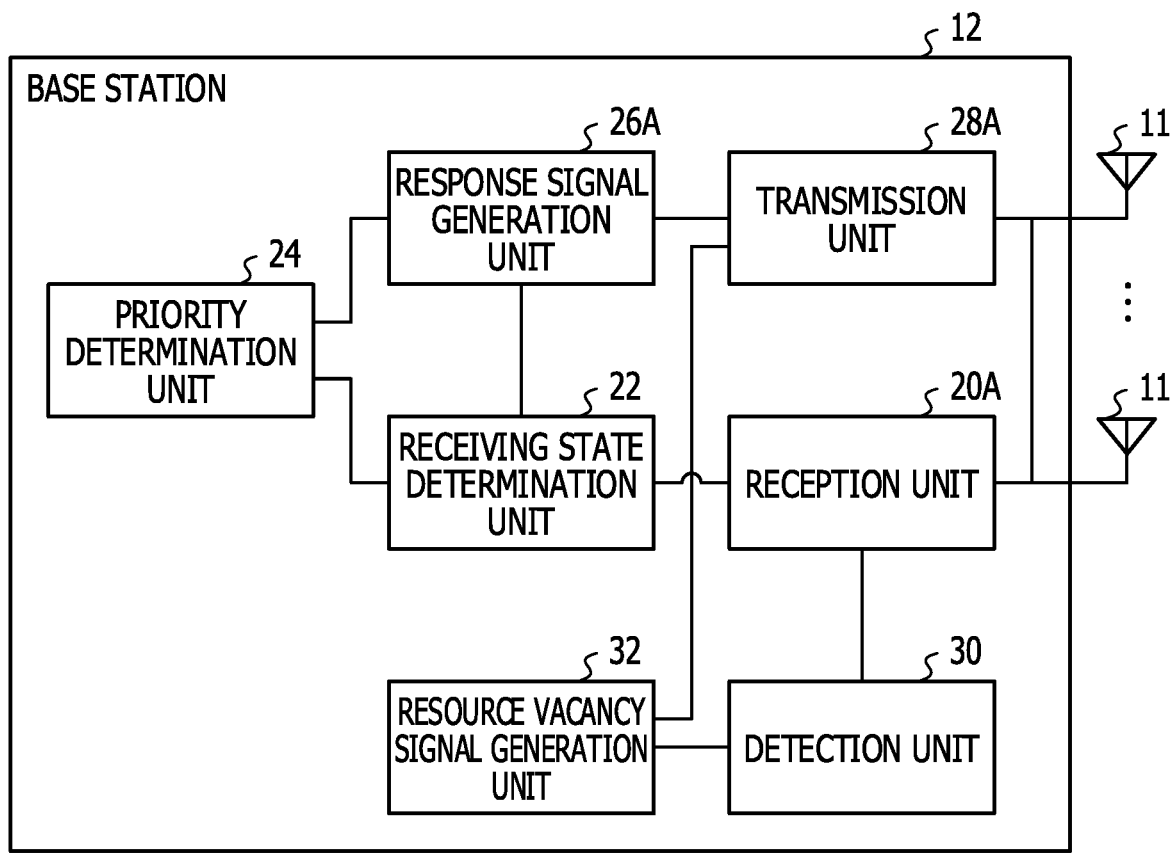
FIG. 9 illustrates a functional block diagram of a base station according to a third embodiment.

Next, a functional configuration of the base station 12 according to the present embodiment will be described with reference to FIG. 9. Note that a functional unit having the function same as that in the base station 12 according to the second embodiment is denoted with the same reference as in FIG. 2, and description thereof is omitted. As illustrated in FIG. 9, the base station 12 includes a reception unit 20A, a receiving state determination unit 22, a priority determination unit 24, a response signal generation unit 26A, and a transmission unit 28A. Furthermore, the base station 12 further includes a detection unit 30 and a resource vacancy signal generation unit 32.

The reception unit 20A has the following functions in addition to the functions of the reception unit 20 according to the second embodiment. The reception unit 20A receives the third signal, that is transmitted from the terminal 14 before the transmission of the first signal, including information indicating that the shared radio resource allocated to the terminal 14 is used. Then, the reception unit 20A executes determined reception processing such as processing for converting an analog signal into a digital signal, fast Fourier transform, or the like on the received third signal.

The detection unit 30 detects that the reception unit 20A receives the third signal. When the detection unit 30 does not detect that the reception unit 20A receives the third signal, the resource vacancy signal generation unit 32 generates the following fourth signal. In other words, in this case, the resource vacancy signal generation unit 32 generates the fourth signal including information indicating that the radio resource allocated to the terminal 14 corresponding to the third signal is vacant. Furthermore, when the detection unit 30 detects that the reception unit 20A receives the third signal, the resource vacancy signal generation unit 32 does not generate the fourth signal.

The transmission unit 28A has the following functions in addition to the functions of the transmission unit 28 according to the second embodiment. The transmission unit 28A transmits the fourth signal generated by the resource vacancy signal generation unit 32 to the terminal 14 to which a radio resource different from the radio resource allocated to the terminal 14 corresponding to the third signal is allocated.

Next, a functional configuration of the terminal 14 according to the present embodiment will be described with reference to FIG. 3. Note that a functional unit having the function same as that in the second embodiment is denoted with the same reference as in the second embodiment, and description thereof is omitted. As illustrated in FIG. 3, the terminal 14 includes a transmission unit 40A, a reception unit 42A, a detection unit 44B, and a control unit 46B.

The transmission unit 40A has the following functions in addition to the functions of the transmission unit 40 according to the second embodiment. The transmission unit 40A transmits the third signal to the base station 12 via an antenna element 13 under control by the control unit 46B.

The reception unit 42A has the following functions in addition to the functions of the reception unit 42 according to the second embodiment. The reception unit 42A receives the fourth signal transmitted from the base station 12 via an antenna element 11 via the antenna element 13.

The detection unit 44B has the following functions in addition to the functions of the detection unit 44A according to the second embodiment. The detection unit 44B detects that the reception unit 42A receives the fourth signal.

The control unit 46B has the following functions in addition to the functions of the control unit 46A according to the second embodiment. When data is generated in an upper layer of an application or the like, the control unit 46B controls the transmission unit 40A to transmit the third signal to the base station 12 before the transmission of the first signal.

Furthermore, when the detection unit 44B detects that the reception unit 42A receives the fourth signal, the control unit 46B outputs an instruction, to the transmission unit 40A, to transmit the first signal by using a vacant radio resource specified by the information included in the fourth signal.

Since hardware configurations of the base station 12 and the terminal 14 are similar to those of the first and second embodiments (refer to FIGS. 4 and 5), description thereof is omitted. Note that the detection unit 30 and the resource vacancy signal generation unit 32 are implemented by executing the base station control program 70 by the CPU 61.

Next, an operation of the wireless communication system 10 according to the present embodiment will be described with reference to FIGS. 10A and 10B. Note that, in the present embodiment, a case will be described where two shared radio resources in the same group (hereinafter, referred to as "group A") are allocated to two terminals 14 #A-1 and 14 #A-2 in advance. A "UEG-A1 resource" and a "UEG-A2 resource" in FIG. 10A respectively indicate the two shared radio resources allocated to both of the terminals 14 #A-1 and 14 #A-2 in each slot.

Furthermore, a shared radio resource in a group different from the group A (hereinafter, referred to as "group B") is allocated to two terminals 14 #B-1 and 14 #B-2. Note that, although not illustrated, radio resources in a frequency band different from that of the "UEG-A1 resource" and the "UEG-A2 resource" (for example, "UEG-B1 resource" and "UEG-B2 resource") are allocated to the two terminals 14 #B-1 and 14 #B-2.

Figure 10A:
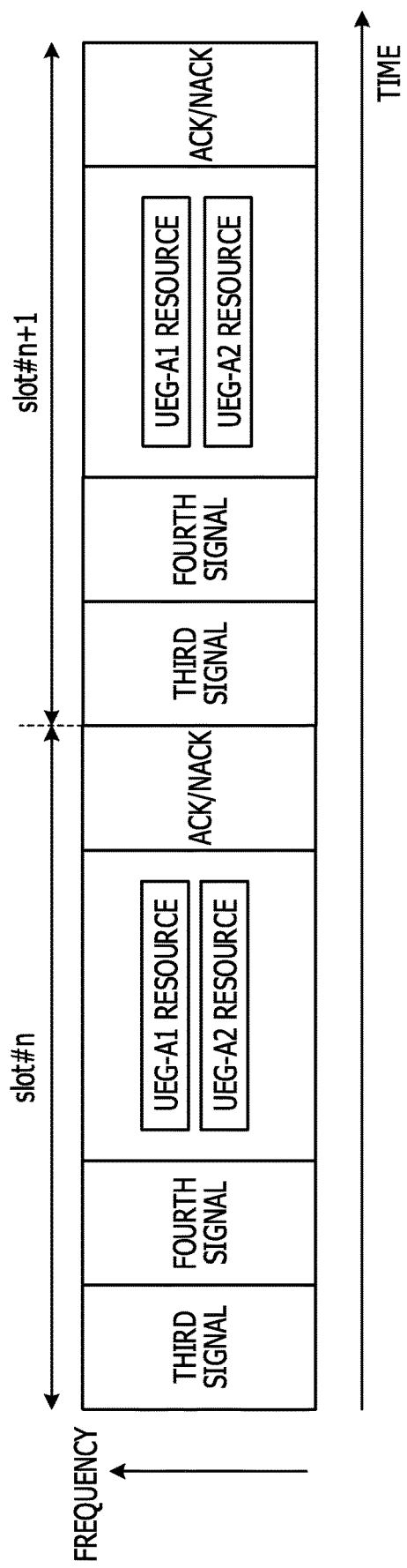
FIG. 10A illustrates a conceptual diagram of a slot according to the third embodiment.

Furthermore, the "third signal" in FIG. 10A indicates a timing at which the terminal 14 transmits the third signal, before transmitting the first signal, by using the "UEG-A1 resource" and the "UEG-A2 resource" in each slot. Furthermore, the "fourth signal" in FIG. 10A indicates a timing at which the base station 12 transmits the fourth signal in response to the third signal transmitted from the terminal 14 in each slot.

Figure 10B:
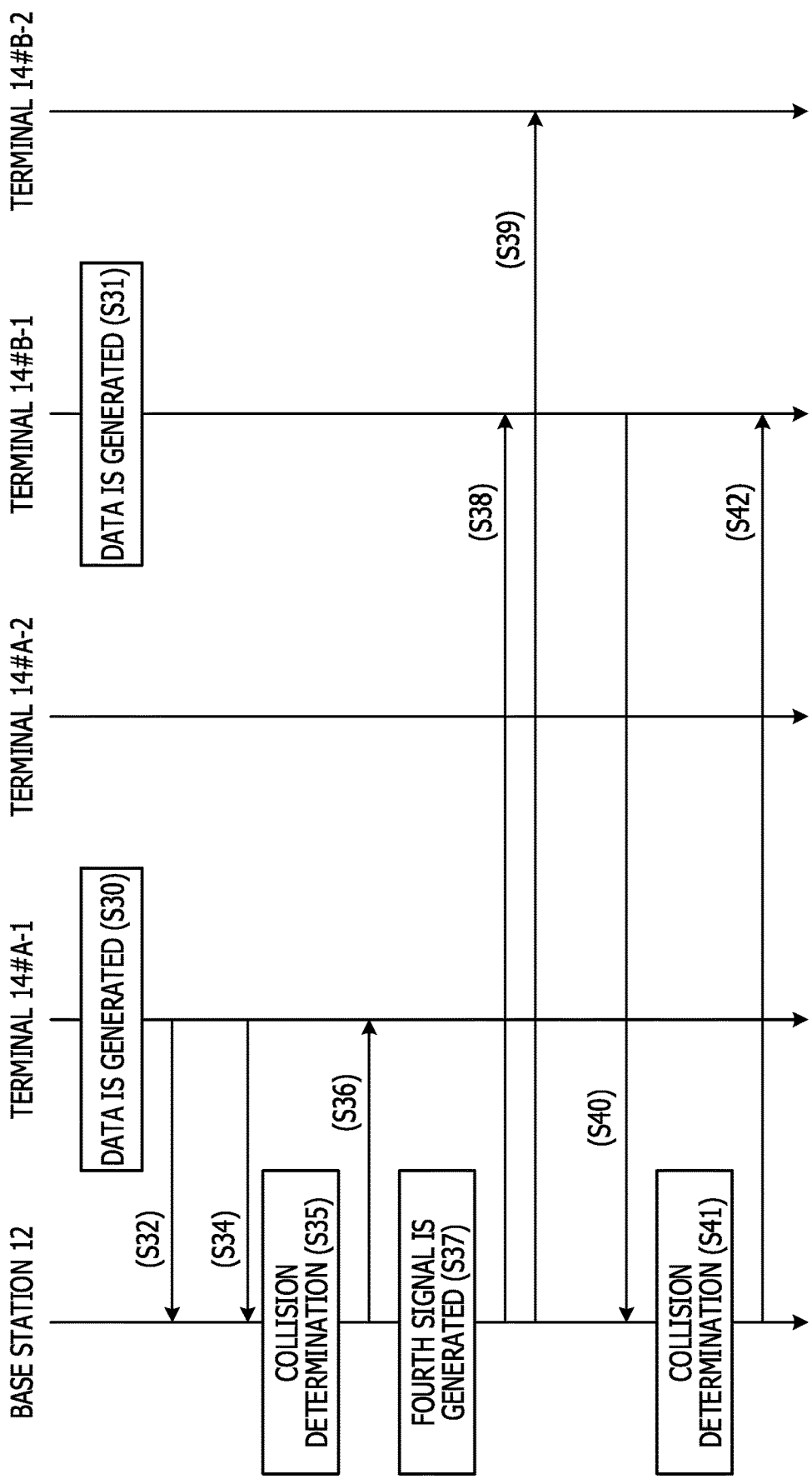
FIG. 10B illustrates a chart illustrating an example of a flow of processing of a wireless communication system according to the third embodiment.

FIG. 10B illustrates a processing chart according to the third embodiment. In steps S30 and S31 illustrated in FIG. 10B, in the terminals 14 #A-1 and 14 #B-1, data to be transmitted is generated in an upper layer, and the data is input to the transmission unit 40A. The transmission unit 40A temporarily holds the input data in the transmission buffer. In step S32, the control unit 46B of the terminal 14 #A-1 controls the transmission unit 40A to transmit the third signal including information indicating that the radio resource allocated to the group A is used to the base station 12. The transmission unit 40A of the terminal 14 #A-1 transmits the third signal to the base station 12. Note that, here, it is assumed that the terminal 14 #B-1 do not transmit the first signal to the base station 12 because the allocated radio resource is congested or the like. Furthermore, since the data to be transmitted is not generated, the terminal 14 #A-2 does not transmit the third signal to the base station 12. Note that the data generated in step S31 cannot be transmitted by using the shared radio resources "UEG-B1 resource" and "UEG-B2 resource" due to some influence (for example, influence of transmission control).

The reception unit 20A of the base station 12 receives the third signal transmitted from the terminal 14 #A-1 in step S32. Furthermore, the detection unit 30 detects that the reception unit 20A receives the third signal. Therefore, the resource vacancy signal generation unit 32 does not generate the fourth signal. Then, in step S34, the transmission unit 40A of the terminal 14 #A-1 transmits the first signal to the base station 12 by using the allocated shared radio resource (here, UEG-A1 resource).

The base station 12 makes collision determination in step S35 as in step S14 on the first signal transmitted from the terminal 14 #A-1 in step S34. Note that, when it is determined that the first signal is normally received before the collision determination, it is not necessary to make the collision determination in step S35. When the base station 12 normally receives the first signal, as in step S22 in the first embodiment, the transmission unit 28A of the base station 12 transmits ACK to the terminal 14 #A-1 in step S36. Furthermore, when the base station 12 cannot normally receive the first signal, the transmission unit 28A of the base station 12 transmits NACK to the terminal 14 #A-1 in step S36. In FIG. 10B, description will be made as assuming that the base station 12 transmits ACK in step S36. Since ACK transmitted in step S36 is received by the terminal 14 #A-1, the data to be transmitted does not exist in the terminal 14 #A-1. Furthermore, the data to be transmitted is not generated in the terminal 14 #A-2. In other words, in the slot #n+1, the terminals 14 #A-1 and 14 #A-2 do not transmit the third signals.

Therefore, the detection unit 30 of the base station 12 does not detect that the reception unit 20A receives the third signal in the slot #n+1. Therefore, the resource vacancy signal generation unit 32 generates the fourth signal including information indicating that the radio resource allocated to the group A is vacant (step S37). Then, in steps S38 and S39, as described above, the transmission unit 28A of the base station 12 transmits the fourth signals generated by the resource vacancy signal generation unit 32 to the terminals 14 #B-1 and 14 #B-2.

The reception units 42A of the terminals 14 #B-1 and 14 #B-2 receive the fourth signals transmitted from the base station 12 in steps S38 and S39. Furthermore, the detection unit 44B detects that the reception unit 42A receives the fourth signal. Although data to be transmitted is not generated in the terminal 14 #B-2, data to be transmitted is generated in the terminal 14 #B-1 in step S31.

Therefore, the control unit 46B of the terminal 14 #B-1 outputs an instruction, to the transmission unit 40A, to transmit the first signal by using the vacant radio resource (here, UEG-A1 resource) specified by the information included in the fourth signal. Then, in step S40, the transmission unit 40A of the terminal 14 #B-1 transmits the first signal including the data generated in step S31 to the base station 12.

As in step S35, the base station 12 makes collision determination in step S41 on the first signal transmitted from the terminal 14 #B-1 in step S40. Note that, when it is determined that the first signal is normally received before the collision determination, it is not necessary to make the collision determination in step S41. When the base station 12 normally receives the first signal, as in step S36, the transmission unit 28A of the base station 12 transmits ACK to the terminal 14 #B-1 in step S42. Note that, when the base station 12 cannot normally receive the first signal, the transmission unit 28A of the base station 12 transmits NACK to the terminal 14 #B-1 in step S42.

As described above, according to the present embodiment, when the base station 12 does not receive the third signal, the base station 12 transmits the fourth signal to the terminal 14 to which the radio resource different from the radio resource allocated to the terminal 14 corresponding to the third signal is allocated. Therefore, deterioration in use efficiency of the radio resource can be prevented.

Note that the description has been made as assuming that the first signal cannot be transmitted by using the shared radio resources "UEG-B1 resource" and "UEG-B2 resource". However, the radio resources including the above shared radio resources may be allocated.

Fourth Embodiment

A fourth embodiment according to the disclosed technology will be described. Note that, since a configuration of a wireless communication system 10 according to the present embodiment is similar to that in the third embodiment, description thereof is omitted. In the third embodiment, when a first signal is transmitted by using a radio resource allocated to a terminal 14 of a group A after a terminal 14 in a group B receives a fourth signal, and collision of the first signals occurs, and the first signal is retransmitted, the followings may occur. In other words, in this case, there is a case where the collision occurs when the terminal 14 of the group A attempts to transmit the first signal by using the allocated radio resource. Therefore, in the present embodiment, when a base station 12 transmits a second signal corresponding to the first signal transmitted from the terminal 14 of the group B to the terminal 14 of the group B, the base station 12 transmits the following fifth signal to the terminal 14 of the group A. In other words, in this case, the base station 12 transmits the fifth signal including information for preventing use of the radio resource allocated to the terminal 14 of the group A to the terminal 14 of the group A.

Figure 11:
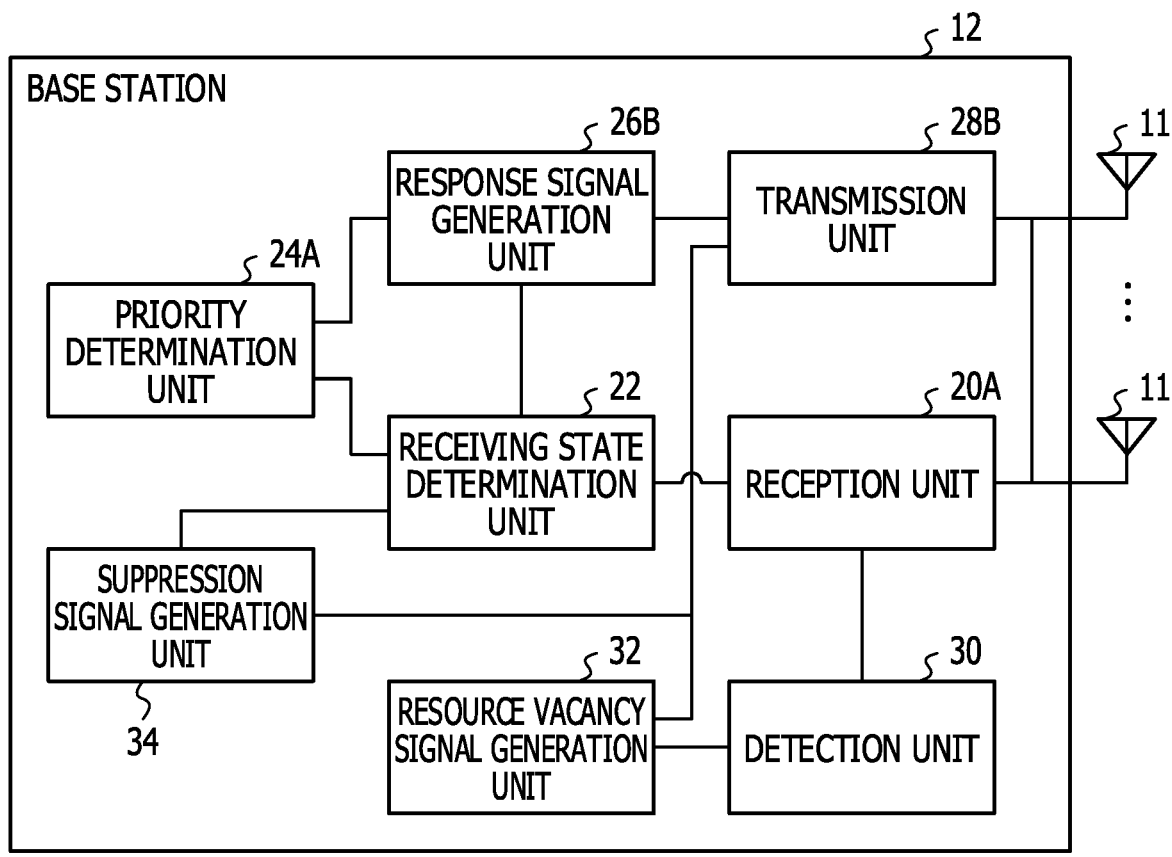
FIG. 11 illustrates a functional block diagram of a base station according to a fourth embodiment.

Next, a functional configuration of the base station 12 according to the present embodiment will be described with reference to FIG. 11. Note that a functional unit having the function same as that in the base station 12 according to the third embodiment is denoted with the same reference as in FIG. 9, and description thereof is omitted. As illustrated in FIG. 11, the base station 12 includes a reception unit 20A, a receiving state determination unit 22, a priority determination unit 24A, a response signal generation unit 26B, a transmission unit 28B, a detection unit 30, a resource vacancy signal generation unit 32, and a suppression signal generation unit 34.

When the receiving state determination unit 22 determines that the collision of the first signals occurs, the priority determination unit 24A determines priority of retransmission of the first signal by the plurality of terminals 14 that is the transmission source of the first signal specified by the receiving state determination unit 22. In the present embodiment, the priority determination unit 24A determines priority of retransmission of the first signal in three stages according to the QoS determined in advance for each terminal 14.

The response signal generation unit 26B generates a second signal as a response to the first signal transmitted from the terminal 14. In the present embodiment, when the receiving state determination unit 22 determines that the first signal can be normally received, the response signal generation unit 26B generates ACK indicating that the first signal can be normally received as the second signal.

Furthermore, when the first signal cannot be normally received by the receiving state determination unit 22, the response signal generation unit 26B generates NACK that requests retransmission to the terminal 14 that is the transmission source of the first signal in accordance with HARQ as the second signal. In the present embodiment, the response signal generation unit 26B includes information regarding a radio resource used to retransmit the first signal by the terminal 14 that is the transmission source of the first signal in NACK. Specifically, the response signal generation unit 26B generates NACK according to the priority of the retransmission determined by the priority determination unit 24A for each terminal 14 that is the transmission source of the first signal.

More specifically, the response signal generation unit 26B generates NACK (hereinafter, referred to as "NACK4") including information indicating that the retransmission upon the reception of the fourth signal can be performed to the terminal 14 determined to have the lowest priority of the retransmission by the priority determination unit 24A. Furthermore, the response signal generation unit 26B generates following NACK to the terminal 14 determined to have the highest priority of the retransmission by the priority determination unit 24A. In other words, in this case, the response signal generation unit 26B generates NACK (hereinafter, referred to as "NACK5") including information indicating that the first signal can be retransmitted by using the radio resource corresponding to the radio resource that is used to transmit the first signal at this time, without receiving the fourth signal.

Furthermore, the response signal generation unit 26B generates following NACK to the terminal 14 determined to have the second highest priority of the retransmission by the priority determination unit 24A. In other words, in this case, the response signal generation unit 26B generates NACK (hereinafter, referred to as "NACK6") including information indicating that the first signal can be retransmitted by using the radio resource corresponding to the radio resource different from the radio resource that is used to transmit the first signal at this time, without receiving the fourth signal.

When the receiving state determination unit 22 determines that the collision of the first signals occurs, the suppression signal generation unit 34 generates the fifth signal including the information for preventing the use of the allocated radio resource to the terminal 14 to which the radio resource in which the collision occurs is allocated.

The transmission unit 28B has the following functions in addition to the functions of the transmission unit 28A according to the third embodiment. In a case of transmitting the second signal to the terminal 14 that is the transmission source of the first signal, the transmission unit 28B transmits the fifth signal generated by the suppression signal generation unit 34 to the following terminal 14. In other words, in this case, the transmission unit 28B transmits the fifth signal to the terminal 14 to which the radio resource that is used to transmit the first signal by the terminal 14 that is the transmission source of the first signal is allocated.

Next, a functional configuration of the terminal 14 according to the present embodiment will be described with reference to FIG. 3. Note that a functional unit having the function same as that in the third embodiment is denoted with the same reference as in the third embodiment, and description thereof is omitted. As illustrated in FIG. 3, the terminal 14 includes a transmission unit 40A, a reception unit 42B, a detection unit 44C, and a control unit 46C.

The reception unit 42B has the following functions in addition to the functions of the reception unit 42A according to the third embodiment. The reception unit 42B receives the fifth signal transmitted from the base station 12 via the antenna element 11 via the antenna element 13.

The detection unit 44C has the following functions in addition to the functions of the detection unit 44B according to the third embodiment. The detection unit 44C detects whether the second signal, on which reception processing by the reception unit 42B has been executed, is ACK, NACK4, NACK5, or NACK6. Furthermore, the detection unit 44C detects that the reception unit 42B receives the fifth signal.

The control unit 46C has the following functions in addition to the functions of the control unit 46B according to the third embodiment. When the detection unit 44C detects that the reception unit 42B receives the fifth signal, the control unit 46C performs control not to transmit the first signal even when the first signal can be transmitted at the next transmission timing.

Furthermore, when the detection unit 44B detects that the second signal is NACK4, the control unit 46C controls the transmission unit 40A as follows in a case where the detection unit 44C detects that the reception unit 42B has received the fourth signal. In other words, in this case, the control unit 46C outputs an instruction, to the transmission unit 40A, to retransmit the first signal by using the radio resource corresponding to the radio resource that is used at this time.

Furthermore, when the detection unit 44C detects that the second signal is NACK5, the control unit 46C outputs an instruction to the transmission unit 40A to retransmit the first signal by using the radio resource corresponding to the radio resource which is used in this time at the next transmission timing. Furthermore, when the detection unit 44C detects that the second signal is NACK6, the control unit 46C outputs an instruction to the transmission unit 40A to retransmit the first signal by using a radio resource corresponding to a radio resource different from the radio resource which is used in this time at the next transmission timing.

Since hardware configurations of the base station 12 and the terminal 14 are similar to those of the first to the third embodiments (refer to FIGS. 4 and 5), description thereof is omitted. Note that the suppression signal generation unit 34 is implemented by executing a base station control program 70 by a CPU 61.

Figure 12A:
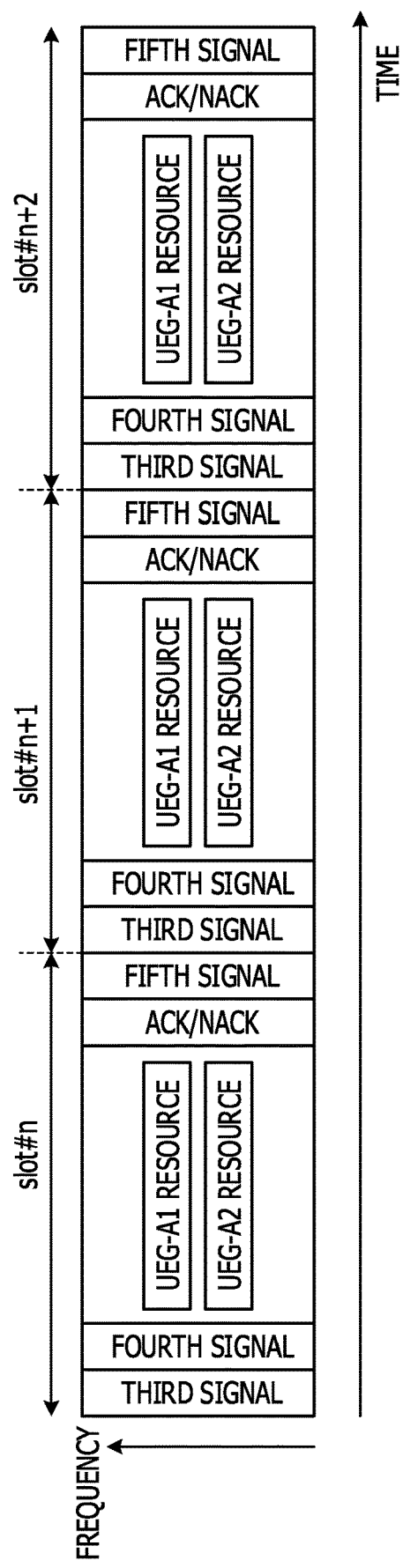
FIG. 12A illustrates a conceptual diagram of a slot according to the fourth embodiment.
Figure 13:
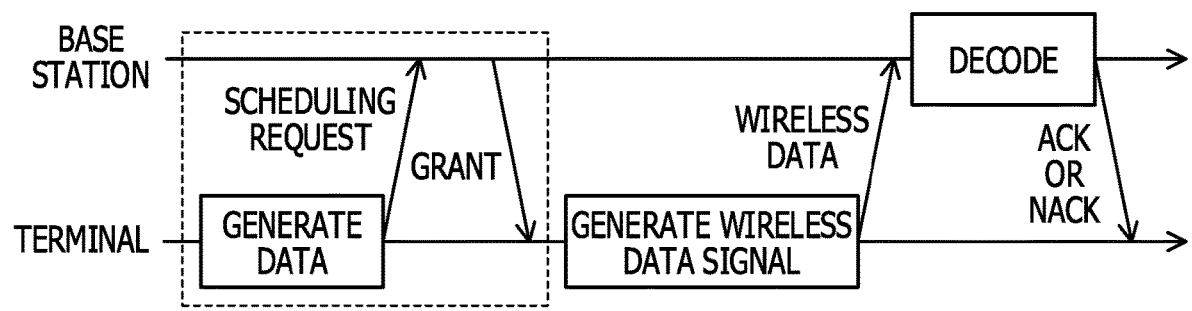
FIG. 13 illustrates a timing chart for explaining wireless communication processing with a method using Grant.
Figure 14:
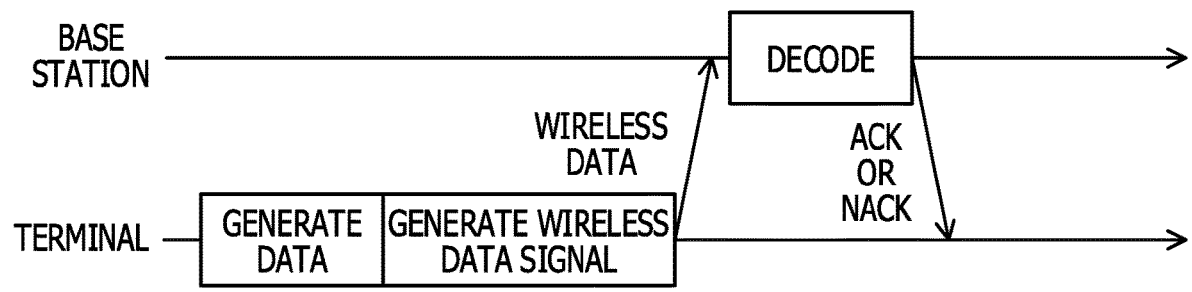
FIG. 14 illustrates a timing chart for explaining wireless communication processing with the Grant-free method.

Next, an operation of the wireless communication system 10 according to the present embodiment will be described with reference to FIGS. 12A and 12B. Note that FIG. 12A is a diagram illustrating an example of allocation of radio resources in the fourth embodiment. Furthermore, FIG. 12B is an example illustrating a processing sequence of a base station 12 and each terminal (terminals 14 #A-1 to 14 #A-3 and terminals 14 #B1 to 14 #B3) corresponding to FIG. 12A. Note that, in the present embodiment, a case will be described where two shared radio resources in the same group (hereinafter, referred to as "group A") is allocated to the three terminals 14 #A-1 to 14 #A-3 in advance. A "UEG-A1 resource" and a "UEG-A2 resource" in FIG. 12A are respectively indicate two shared radio resources allocated to the terminals 14 #A-1 to 14 #A-3 in each slot.

Furthermore, a shared radio resource in a group different from the group A (hereinafter, referred to as "group B") is allocated to the three terminals 14 #B-1 to 14 #B-3. Note that, although not illustrated, the radio resources allocated to the three terminals 14 #B-1 to 14 #B-3 are radio resources having a frequency band different from those of the "UEG-A1 resource" and the "UEG-A2 resource".

Furthermore, the "fifth signal" in FIG. 12A indicates a timing at which the fifth signal is transmitted when the second signal corresponding to the first signal transmitted by using the "UEG-A1 resource" and the "UEG-A2 resource" in each slot is transmitted.

In steps S50A to S50C illustrated in FIG. 12B, in the terminals 14 #B-1 to 14 #B-3, data to be transmitted is generated in an upper layer, and the data is input to the transmission unit 40A. The transmission unit 40A temporarily holds the input data in the transmission buffer. Since the data to be transmitted is not generated, the terminals 14 #A-1 to 14 #A-3 do not transmit the third signal to the base station 12. In other words, the base station 12 does not receive the third signal in a slot #n. Note that the data generated in steps S50A to S50C cannot be transmitted by using shared radio resources "UEG-B1 resource" and "UEG-B2 resource" due to some influence (for example, influence of transmission control).

Therefore, the detection unit 30 of the base station 12 does not detect that the reception unit 20A receives the third signal. Therefore, the resource vacancy signal generation unit 32 generates the fourth signal including information indicating that the radio resource allocated to the group A is vacant (step S51). Then, in steps S52A to 52C, as described above, the transmission unit 28B of the base station 12 transmits the fourth signals generated by the resource vacancy signal generation unit 32 to the terminals 14 #B-1 to 14 #B-3.

The reception units 42B of the terminals 14 #B-1 to 14 #B-3 receive the fourth signals transmitted from the base station 12 in steps S52A to S52C. Furthermore, the detection unit 44C detects that the reception unit 42B receives the fourth signal. Furthermore, in the terminals 14 #B-1 to 14 #B-3, the data to be transmitted is generated in steps S50A to S50C.

Therefore, the control unit 46C of each of the terminals 14 #B-1 to 14 #B-3 outputs an instruction, to the transmission unit 40A, to transmit the first signal by using the vacant radio resource (here, UEG-A1 resource) specified by the information included in the fourth signal. Then, in steps S54A to 54C, the transmission units 40A of the terminals 14 #B-1 to 14 #B-3 transmit the first signals including the data generated in steps S50A to S50C to the base station 12.

Since the first signals transmitted from the respective terminals 14 #B-1 to 14 #B-3 in steps S54A to S54C are transmitted by using the radio resource in the same frequency band at a first transmission timing, reception quality of the first signal in the base station 12 is deteriorated by interference. Therefore, in step S56, the receiving state determination unit 22 of the base station 12 determines that the collision of the first signals occurs as described above. Furthermore, as described above, the receiving state determination unit 22 specifies the terminals 14 #B-1 to 14 #B-3 that are transmission sources of the first signal received by the reception unit 20A.

Furthermore, the priority determination unit 24A determines priority of retransmission of the first signals of the terminals 14 #B-1 to 14 #B-3 that are the transmission sources of the first signals specified by the receiving state determination unit 22. Note that, here, a case will be described where the priority determination unit 24A determines that the terminal 14 #B-3 has the lowest priority, the terminal 14 #B-1 has the highest priority, and the terminal 14 #B-2 has the second highest priority. As described above, the response signal generation unit 26B generates NACK4 for the terminal 14 #B-3, generates NACK6 for the terminal 14 #B-2, and generates NACK5 for the terminal 14 #B-1 according to the determination result regarding the priority by the priority determination unit 24A.

Furthermore, the suppression signal generation unit 34 generates a fifth signal including information for preventing the terminals 14 #A-1 to 14 #A-3 to which the "UEG-A1 resource" and the "UEG-A2 resource" are allocated from using the radio resource allocated to the terminals 14 #A-1 to 14 #A-3.

In step S58, the transmission unit 28B transmits NACK5 generated by the response signal generation unit 26B to the terminal 14 #B-1. Furthermore, in step S60, the transmission unit 28B transmits NACK6 generated by the response signal generation unit 26B to the terminal 14 #B-2. Furthermore, in step S62, the transmission unit 28B transmits NACK4 generated by the response signal generation unit 26B to the terminal 14 #B-3.

Moreover, in steps S64A and S64C, the transmission unit 28B transmits the fifth signals generated by the suppression signal generation unit 34 to the terminals 14 #A-1 to 14 #A-3. The reception units 42B of the terminals 14 #A-1 to 14 #A-3 receive the fifth signals transmitted from the base station 12 in steps S64A to S64C. Therefore, even when the data to be transmitted is generated, the terminals 14 #A-1 to 14 #A-3 do not transmit the first signals to the base station 12 in the slot #n+1.

Furthermore, the reception unit 42B of the terminal 14 #B-1 receives NACK5 transmitted from the base station 12 in step S58. In other words, the detection unit 44C of the terminal 14 #B-1 detects that the second signal is NACK5. As a result of the detection, the control unit 46C of the terminal 14 #B-1 outputs an instruction, to the transmission unit 40A, to retransmit the first signal by using the radio resource (UEG-A1 resource in present embodiment) corresponding to the radio resource that is used at this time at the first transmission timing (slot #n+1 in present embodiment). Then, in step S66, as described above, the transmission unit 40A of the terminal 14 #B-1 retransmits the first signal to the base station 12 by using the UEG-A1 resource of the slot #n+1.

Furthermore, the reception unit 42B of the terminal 14 #B-2 receives NACK6 transmitted from the base station 12 in step S60. In other words, the detection unit 44C of the terminal 14 #B-2 detects that the second signal is NACK6. As a result of the detection, the control unit 46C of the terminal 14 #B-2 outputs an instruction, to the transmission unit 40A, to retransmit the first signal by using the radio resource (UEG-A2 resource in present embodiment) corresponding to the radio resource different from the radio resource that is used at this time at the first transmission timing (slot #n+1 in present embodiment). Then, in step S68, as described above, the transmission unit 40A of the terminal 14 #B-2 retransmits the first signal to the base station 12 by using the UEG-A2 resource of the slot #n+1.

Furthermore, the reception unit 42B of the terminal 14 #B-3 receives NACK4 transmitted from the base station 12 in step S62. In other words, the detection unit 44C of the terminal 14 #B-3 detects that the second signal is NACK4. Furthermore, the reception unit 42B of the terminal 14 #B-3 does not receive the fourth signal in the slot #n+1. Therefore, the terminal 14 #B-3 does not retransmit the first signal in the slot #n+1.

The first signal transmitted from the terminal 14 #B-1 in step S66 and the first signal transmitted from the terminal 14 #B-2 in step S68 are transmitted by using radio resources in different frequency bands. Therefore, the collision of the first signals does not occur. Therefore, as in the second embodiment, in steps S70A and S70B, the transmission unit 28B of the base station 12 transmits ACK or NACK to the terminals 14 #B-1 and 14 #B-2. Note that the description will be made below as assuming that the transmission unit 28B of the base station 12 transmits ACK.

Furthermore, since the data to be transmitted is not generated, the terminals 14 #A-1 to 14 #A-3 do not transmit the third signal to the base station 12. In other words, the base station 12 does not receive the third signal in a slot #n+2.

Therefore, the detection unit 30 of the base station 12 does not detect that the reception unit 20A receives the third signal. Therefore, the resource vacancy signal generation unit 32 generates the fourth signal. Then, in steps S72A to 72C, as described above, the transmission unit 28B of the base station 12 transmits the fourth signals generated by the resource vacancy signal generation unit 32 to the terminals 14 #B-1 to 14 #B-3.

The reception units 42B of the terminals 14 #B-1 to 14 #B-3 receive the fourth signals transmitted from the base station 12 in steps S72A to S72C. Furthermore, the detection unit 44C detects that the reception unit 42B receives the fourth signal.

Therefore, the control unit 46C of the terminal 14 #B-3 outputs an instruction, to the transmission unit 40A, to retransmit the first signal by using the vacant radio resource (here, UEG-A1 resource) specified by the information included in the fourth signal. Then, in step S74, as described above, the transmission unit 40A of the terminal 14 #B-3 retransmits the first signal to the base station 12 by using the UEG-A1 resource of the slot #n+2.

No collision of the first signal transmitted from the terminal 14 #B-3 in step S74 occurs. As in step S70A, the transmission unit 28B of the base station 12 transmits, in step S76, ACK or NACK to the terminal 14 #B-3.

As described above, according to the present embodiment, when the base station 12 transmits the second signals to the terminals 14 #B-1 to 14 #B-3, the base station 12 further transmits the fifth signals to the terminals 14 #A-1 to 14 #A-3. Therefore, as a result of suppressing the occurrence of the collision, it is possible to suppress an increase in the transmission delay time.

Note that the description has been made as assuming that the first signal cannot be transmitted by using the shared radio resources "UEG-B1 resource" and "UEG-B2 resource". However, the radio resources including the above shared radio resources may be allocated.

Note that the slot described in each embodiment may be a slot in the Long Term Evolution (LTE) or a mini slot obtained by dividing the slot in the LTE into a plurality of mini slots.

Note that a mode in which the base station control program 70 is stored (installed) in the storage unit 63 in advance has been described in each embodiment. However, the present invention is not limited to this. The base station control program 70 can be provided in the form recorded in a recording medium such as a CD-ROM, a DVD-ROM, a USB memory, a memory card, or the like.

Furthermore, in each embodiment, the mode in which the terminal control program 90 is stored in the storage unit 83 in advance has been described. However, provision of the program is not limited to this. The terminal control program 90 can be provided in the form recorded in a recording medium such as a CD-ROM, a DVD-ROM, a USB memory, a memory card, or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station capable of performing wireless communication with a wireless communication device with a Grant-free method, the base station comprising:
   a reception circuit configured to receive a first signal transmitted from the wireless communication device via a shared radio resource allocated to the wireless communication device; and
   a transmission circuit configured to transmit a second signal including information regarding a radio resource used for retransmission to the wireless communication device when retransmission of the first signal is requested to the wireless communication device, wherein the information regarding a radio resource used for retransmission to the wireless communication device corresponds to a priority of the retransmission, the priority of the retransmission based on a Quality of Service (QoS) parameter for the wireless communication device and a timing at which the reception circuit receives the first signal.

2. The base station according to claim 1, wherein the information regarding the radio resource used for retransmission includes information regarding a transmission timing in the retransmission.

3. The base station according to claim 1, wherein a plurality of the shared radio resources is allocated to the wireless communication device, and
   the information regarding the radio resource used for retransmission includes information indicating whether the radio resource corresponds to one of a first shared radio resource and a second shared radio resource different from the first shared radio resource.

4. The base station according to claim 1, wherein
when a third signal including information indicating that the shared radio resource is used is not received by the reception circuit,
the transmission circuit is configured to transmit a fourth signal including information indicating that the shared radio resource is vacant to another wireless communication device to which a radio resource different from the shared radio resource is allocated.

5. The base station according to claim 4, wherein
when transmitting a response signal corresponding to a data signal transmitted from the other wireless communication device using the shared radio resource to the other wireless communication device,
the transmission circuit is configured to transmit a fifth signal including information for preventing use of the shared radio resource to the wireless communication device.

6. A terminal capable of performing wireless communication with a base station with a Grant-free method, the terminal comprising:
a transmission circuit configured to transmit a first signal to the base station via an allocated shared radio resource; and
a reception circuit configured to receive a second signal transmitted from the base station as a response to the first signal transmitted by the transmission circuit, wherein
when information regarding a radio resource used for retransmission is included in the second signal, the transmission circuit retransmits the first signal to the base station depending on the information regarding the radio resource used for retransmission, wherein the information regarding a radio resource used for retransmission to the terminal corresponds to a priority of the retransmission, the priority of the retransmission based on a Quality of Service (QoS) parameter for the terminal and a timing at which the base station receives the first signal.

7. The terminal according to claim 6, wherein
the information regarding the radio resource used for retransmission includes information regarding a transmission timing in the retransmission.

8. The terminal according to claim 6, wherein
a plurality of the shared radio resources is allocated, and
the information regarding the radio resource used for retransmission includes information indicating one of a first shared radio resource and a second shared radio resource different from the first shared radio resource.

9. The terminal according to claim 6, wherein
the transmission circuit is configured to transmit a third signal including information indicating that the shared radio resource is used to the base station.

10. The terminal according to claim 9, wherein
the reception circuit is configured to receive a fifth signal that is transmitted from the base station and includes information for preventing use of the allocated radio resource, and
when the reception circuit receives the fifth signal, the transmission circuit reduces opportunities for the transmission of the first signal to the base station.

11. A communication method that is executable by a base station that performs wireless communication with a wireless communication device with a Grant-free method, the communication method comprising:
when retransmission of a first signal transmitted from the wireless communication device via a shared radio resource allocated to the wireless communication device is requested to the wireless communication device, transmitting a second signal including information regarding a radio resource used for retransmission to the wireless communication device, wherein the information regarding a radio resource used for retransmission to the wireless communication device corresponds to a priority of the retransmission, the priority of the retransmission based on a Quality of Service (QoS) parameter for the wireless communication device and a timing at which the base station receives the first signal.

12. The communication method according to claim 11, wherein
the information regarding the radio resource used for retransmission includes information indicating a transmission timing in the retransmission.

13. The communication method according to claim 11, wherein
a plurality of the shared radio resources is allocated to the wireless communication device, and
the information regarding the radio resource used for retransmission includes information indicating one of a first shared radio resource and a second shared radio resource different from the first shared radio resource.

14. The communication method according to claim 11, wherein
when a third signal is not received that is transmitted before the first signal is transmitted from the wireless communication device to which the shared radio resource is allocated and includes information indicating that the allocated shared radio resource is used,
transmitting a fourth signal including information indicating that the shared radio resource is vacant to another wireless communication device to which a radio resource different from the shared radio resource is allocated.

15. The communication method according to claim 14, wherein
when the second signal corresponding to the first signal transmitted from the other wireless communication device using the shared radio resource is transmitted to the other wireless communication device,
a fifth signal including information for preventing use of a radio resource allocated to the wireless communication device is further transmitted to the wireless communication device.

16. A wireless communication system capable of performing wireless communication between a wireless communication device and a base station with a Grant-free method, the wireless communication system comprising:
the wireless communication device comprising
a first transmission circuit configured to transmit a first signal to the base station via an allocated shared radio resource, and
the base station comprising:
a reception circuit configured to receive the first signal, and
a second transmission circuit configured to transmit a second signal including information regarding a radio resource used for retransmission to the wireless communication device when retransmission of the first signal is requested to the wireless communication device, wherein the information regarding a radio resource used for retransmission to the wireless communication device corresponds to a priority of the retransmission, the priority of the retransmission based on a Quality of Service (QoS) parameter for the wireless communication device and a timing at which the reception circuit receives the first signal.

\* \* \* \* \*